(12) United States Patent
Kühn et al.

(10) Patent No.: US 7,630,106 B2
(45) Date of Patent: Dec. 8, 2009

(54) METHODS AND APPARATUS FOR DETERMINING COLORANT LIMITS FOR CALIBRATING DIGITAL IMAGING DEVICES

(75) Inventors: Mario Kühn, Duisburg (DE); Samer Mady, Krefeld (DE)

(73) Assignee: Electronics for Imaging, Inc., Foster City, CA (US)

( * ) Notice: Subject to any disclaimer, the term of this patent is extended or adjusted under 35 U.S.C. 154(b) by 594 days.

(21) Appl. No.: 10/836,072

(22) Filed: Apr. 30, 2004

(65) Prior Publication Data

US 2005/0243337 A1 Nov. 3, 2005

(51) Int. Cl.
*H04N 1/60* (2006.01)
*H04N 1/54* (2006.01)

(52) U.S. Cl. .................. 358/504; 358/1.9; 358/500; 382/167

(58) Field of Classification Search .................. 358/3.1, 358/508, 1.9, 3.23, 504, 518, 578, 577, 523, 358/201, 1.1, 520, 515; 382/162; 715/528; 347/19, 256, 240, 43, 37; 101/218
See application file for complete search history.

(56) References Cited

U.S. PATENT DOCUMENTS

| | | | |
|---|---|---|---|
| 5,333,069 A | | 7/1994 | Spence |
| 5,553,199 A | * | 9/1996 | Spaulding et al. ............ 358/1.9 |
| 6,233,061 B1 | * | 5/2001 | Huang et al. ................. 358/1.9 |
| 6,435,657 B1 | | 8/2002 | Couwenhoven et al. |
| 6,575,095 B1 | | 6/2003 | Mahy et al. |
| RE38,180 E | * | 7/2003 | Edge ............................ 347/19 |
| 6,868,179 B2 | * | 3/2005 | Gruzdev et al. ............. 382/167 |
| 7,019,868 B2 | | 3/2006 | Chang et al. |
| 7,023,570 B2 | * | 4/2006 | Marsden et al. ............ 358/1.13 |
| 7,050,196 B1 | | 5/2006 | Piatt et al. |
| 7,057,756 B2 | | 6/2006 | Ogasahara et al. |
| 7,097,269 B2 | * | 8/2006 | Collette et al. ................ 347/19 |
| 7,262,881 B2 | | 8/2007 | Livens et al. |
| 7,307,753 B2 | * | 12/2007 | Sasaki et al. .................. 358/1.9 |
| 2002/0008880 A1 | | 1/2002 | Dewitte et al. |
| 2003/0002058 A1 | | 1/2003 | Couwenhoven et al. |
| 2003/0058459 A1 | | 3/2003 | Wu et al. |
| 2003/0063338 A1 | | 4/2003 | Gudaitis et al. |
| 2003/0123072 A1 | | 7/2003 | Spronk |
| 2003/0132984 A1 | | 7/2003 | Maltz |
| 2004/0131371 A1 | * | 7/2004 | Itagaki et al. .................. 399/49 |

OTHER PUBLICATIONS

Stefan Livens and Marc Mahy, "Quality managed proofing: The road to visual consistency," Presented at the 29th International IARIGAI Research Conference, Sep. 8-11, 2002, Switzerland.

* cited by examiner

*Primary Examiner*—King Y Poon
*Assistant Examiner*—Lawrence E Wills
(74) *Attorney, Agent, or Firm*—Michael A. Glenn; Glenn Patent Group

(57) ABSTRACT

Methods and apparatus are provided for calibrating a digital color imaging device to a printing press by determining a total colorant limit, per-channel colorant limits, and channel linearization tables using colorimetric and/or spectrophotometric techniques. In addition, for digital color imaging devices that use multi-hue colorants, methods and apparatus are provided for determining distribution functions for the multi-hue colorants as a function of input values.

18 Claims, 24 Drawing Sheets

| Patch | C | M | Y | K | L | a | b |
|---|---|---|---|---|---|---|---|
| A1 | 33 | 33 | 33 | 0 | 31.35 | -12.04 | 3.89 |
| A2 | 40 | 40 | 40 | 0 | 23.61 | -13.85 | 2.75 |
| A3 | 47 | 47 | 47 | 0 | 18.95 | -13.24 | 0.28 |
| A4 | 53 | 53 | 53 | 0 | 16.22 | -11.66 | -1.11 |
| A5 | 60 | 60 | 60 | 0 | 14.55 | -9.64 | -2.28 |
| A6 | 67 | 67 | 67 | 0 | 13.23 | -7.21 | -3.36 |
| A7 | 73 | 73 | 73 | 0 | 12.38 | -5.29 | -4.13 |
| A8 | 80 | 80 | 80 | 0 | 11.07 | -3.61 | -4.69 |
| A9 | 87 | 87 | 87 | 0 | 11.01 | -2.14 | -5.18 |
| A10 | 93 | 93 | 93 | 0 | 10.84 | -1.63 | -5.53 |
| A11 | 100 | 100 | 100 | 0 | 10.53 | -1.20 | -5.94 |
| A12 | 100 | 100 | 100 | 0 | 10.63 | -1.23 | -6.06 |
| A13 | 100 | 100 | 100 | 0 | 10.80 | -1.23 | -6.00 |
| A14 | 100 | 100 | 100 | 0 | 11.17 | -1.06 | -5.82 |
| A15 | 100 | 100 | 100 | 0 | 10.56 | -1.31 | -5.88 |
| A16 | 100 | 100 | 100 | 0 | 10.60 | -1.23 | -5.94 |

FIG. 6A

| Patch | C | M | Y | K | L | a | b |
|---|---|---|---|---|---|---|---|
| B1 | 50 | 0 | 50 | 0 | 42.66 | -77.40 | 26.78 |
| B2 | 60 | 0 | 60 | 0 | 39.00 | -76.29 | 24.80 |
| B3 | 70 | 0 | 70 | 0 | 35.33 | -71.59 | 21.63 |
| B4 | 80 | 0 | 80 | 0 | 32.00 | -65.48 | 18.35 |
| B5 | 90 | 0 | 90 | 0 | 29.15 | -58.98 | 15.30 |
| B6 | 100 | 0 | 100 | 0 | 26.75 | -53.25 | 12.46 |
| B7 | 100 | 0 | 100 | 0 | 26.75 | -53.26 | 12.52 |
| B8 | 100 | 0 | 100 | 0 | 26.73 | -53.30 | 12.52 |
| B9 | 100 | 0 | 100 | 0 | 26.69 | -53.30 | 12.48 |
| B10 | 100 | 0 | 100 | 0 | 26.72 | -53.46 | 12.58 |
| B11 | 100 | 0 | 100 | 0 | 26.77 | -53.39 | 12.59 |
| B12 | 100 | 0 | 100 | 0 | 26.90 | -53.21 | 12.60 |
| B13 | 100 | 0 | 100 | 0 | 26.77 | -53.29 | 12.51 |
| B14 | 100 | 0 | 100 | 0 | 26.72 | -53.08 | 12.64 |
| B15 | 100 | 0 | 100 | 0 | 26.79 | -53.08 | 12.43 |
| B16 | 100 | 0 | 100 | 0 | 26.77 | -53.02 | 12.46 |

FIG. 6B

| Patch | C | M | Y | K | L | a | b |
|---|---|---|---|---|---|---|---|
| C1 | 25 | 25 | 25 | 25 | 27.43 | -7.48 | 2.93 |
| C2 | 30 | 30 | 30 | 30 | 20.71 | -8.02 | 1.48 |
| C3 | 35 | 35 | 35 | 35 | 15.94 | -5.79 | -0.60 |
| C4 | 40 | 40 | 40 | 40 | 12.83 | -3.88 | -2.46 |
| C5 | 45 | 45 | 45 | 45 | 11.33 | -2.15 | -3.61 |
| C6 | 50 | 50 | 50 | 50 | 10.40 | -1.38 | -4.21 |
| C7 | 55 | 55 | 55 | 55 | 10.20 | -0.87 | -4.49 |
| C8 | 60 | 60 | 60 | 60 | 9.90 | -0.69 | -4.68 |
| C9 | 65 | 65 | 65 | 65 | 9.18 | -0.31 | -4.46 |
| C10 | 70 | 70 | 70 | 70 | 11.12 | 0.12 | -4.98 |
| C11 | 75 | 75 | 75 | 75 | 11.41 | 0.13 | -5.28 |
| C12 | 80 | 80 | 80 | 80 | 11.66 | 0.21 | -4.72 |
| C13 | 85 | 85 | 85 | 85 | 14.24 | 0.74 | -3.59 |
| C14 | 90 | 90 | 90 | 90 | 15.19 | 0.90 | -3.13 |
| C15 | 95 | 95 | 95 | 95 | 17.76 | 0.86 | -2.37 |
| C16 | 100 | 100 | 100 | 100 | 18.54 | -1.42 | -2.18 |

| Patch | C | M | Y | K | X | Y | Z | L | a | b | Chroma |
|---|---|---|---|---|---|---|---|---|---|---|---|
| A1 | 100 | 0 | 0 | 0 | 9.80 | 14.43 | 48.94 | 44.84 | -28.90 | -63.15 | 69.45 |
| A2 | 95 | 0 | 0 | 0 | 10.13 | 15.12 | 49.90 | 45.80 | -30.42 | -62.60 | 69.60 |
| A3 | 90 | 0 | 0 | 0 | 10.50 | 15.84 | 50.74 | 46.76 | -31.75 | -61.88 | 69.55 |
| A4 | 85 | 0 | 0 | 0 | 10.94 | 16.72 | 51.62 | 47.91 | -33.38 | -60.89 | 69.44 |
| A5 | 80 | 0 | 0 | 0 | 11.74 | 17.98 | 52.42 | 49.47 | -34.37 | -59.06 | 68.34 |
| A6 | 75 | 0 | 0 | 0 | 12.29 | 18.86 | 53.06 | 50.52 | -35.09 | -57.95 | 67.74 |
| A7 | 70 | 0 | 0 | 0 | 13.13 | 20.12 | 53.92 | 51.97 | -35.73 | -56.38 | 66.75 |
| A8 | 65 | 0 | 0 | 0 | 13.22 | 20.78 | 55.48 | 52.71 | -38.31 | -56.77 | 68.49 |
| A9 | 60 | 0 | 0 | 0 | 14.20 | 22.29 | 56.68 | 54.33 | -39.10 | -55.22 | 67.66 |
| A10 | 56 | 0 | 0 | 0 | 15.03 | 23.50 | 57.41 | 55.58 | -39.44 | -53.82 | 66.72 |
| A11 | 53 | 0 | 0 | 0 | 15.81 | 24.66 | 58.19 | 56.74 | -39.86 | -52.62 | 66.01 |
| A12 | 47 | 0 | 0 | 0 | 17.42 | 26.80 | 59.42 | 58.79 | -39.69 | -50.34 | 64.10 |
| A13 | 44 | 0 | 0 | 0 | 18.60 | 28.31 | 60.23 | 60.17 | -39.39 | -48.77 | 62.69 |
| A14 | 40 | 0 | 0 | 0 | 20.34 | 30.43 | 61.29 | 62.02 | -38.64 | -46.62 | 60.55 |
| A15 | 36 | 0 | 0 | 0 | 22.29 | 32.66 | 62.41 | 63.88 | -37.44 | -44.51 | 58.16 |
| A16 | 32 | 0 | 0 | 0 | 24.74 | 35.30 | 63.42 | 65.98 | -35.62 | -41.87 | 54.98 |
| A17 | 28 | 0 | 0 | 0 | 27.57 | 38.17 | 64.37 | 68.15 | -33.27 | -39.05 | 51.30 |

FIG. 10A

| Patch | C | M | Y | K | X | Y | Z | L | a | b | Chroma |
|---|---|---|---|---|---|---|---|---|---|---|---|
| A18 | 0 | 100 | 0 | 0 | 29.64 | 13.37 | 13.79 | 43.32 | 81.80 | -7.91 | 82.18 |
| A19 | 0 | 95 | 0 | 0 | 30.48 | 13.87 | 14.93 | 44.05 | 81.81 | -9.60 | 82.37 |
| A20 | 0 | 90 | 0 | 0 | 30.93 | 14.19 | 15.94 | 44.50 | 81.50 | -11.31 | 82.28 |
| A21 | 0 | 85 | 0 | 0 | 31.39 | 14.52 | 17.02 | 44.97 | 81.19 | -13.06 | 82.23 |
| A22 | 0 | 80 | 0 | 0 | 32.60 | 15.24 | 18.39 | 45.96 | 81.28 | -14.44 | 82.55 |
| B1 | 0 | 75 | 0 | 0 | 33.21 | 15.70 | 19.57 | 46.58 | 80.78 | -15.92 | 82.33 |
| B2 | 0 | 70 | 0 | 0 | 33.92 | 16.24 | 20.90 | 47.29 | 80.20 | -17.44 | 82.07 |
| B3 | 0 | 65 | 0 | 0 | 34.87 | 17.09 | 22.63 | 48.37 | 78.78 | -18.97 | 81.04 |
| B4 | 0 | 60 | 0 | 0 | 36.04 | 18.02 | 24.32 | 49.52 | 77.78 | -20.15 | 80.35 |
| B5 | 0 | 56 | 0 | 0 | 37.10 | 18.90 | 25.81 | 50.57 | 76.75 | -21.00 | 79.58 |
| B6 | 0 | 53 | 0 | 0 | 37.80 | 19.66 | 27.17 | 51.45 | 75.23 | -21.83 | 78.33 |
| B7 | 0 | 47 | 0 | 0 | 39.58 | 21.46 | 29.82 | 53.45 | 72.27 | -22.73 | 75.76 |
| B8 | 0 | 44 | 0 | 0 | 40.72 | 22.61 | 31.42 | 54.67 | 70.55 | -23.13 | 74.25 |
| B9 | 0 | 40 | 0 | 0 | 42.07 | 24.20 | 33.45 | 56.29 | 67.67 | -23.40 | 71.61 |
| B10 | 0 | 36 | 0 | 0 | 43.41 | 25.73 | 35.20 | 57.78 | 65.23 | -23.37 | 69.28 |

FIG. 10B

| Patch | C | M | Y | K | X | Y | Z | L | a | b | Chroma |
|---|---|---|---|---|---|---|---|---|---|---|---|
| B11 | 0 | 0 | 100 | 0 | 69.39 | 75.00 | 5.23 | 89.39 | -6.18 | 101.96 | 102.15 |
| B12 | 0 | 0 | 95 | 0 | 69.23 | 75.02 | 5.52 | 89.40 | -6.56 | 100.53 | 100.74 |
| B13 | 0 | 0 | 90 | 0 | 69.48 | 75.42 | 5.80 | 89.59 | -6.83 | 99.50 | 99.74 |
| B14 | 0 | 0 | 85 | 0 | 69.68 | 75.82 | 6.28 | 89.78 | -7.20 | 97.61 | 97.87 |
| B15 | 0 | 0 | 80 | 0 | 69.64 | 75.98 | 6.70 | 89.85 | -7.61 | 95.89 | 96.19 |
| B16 | 0 | 0 | 75 | 0 | 69.89 | 76.39 | 7.28 | 90.04 | -7.89 | 93.78 | 94.11 |
| B17 | 0 | 0 | 70 | 0 | 69.73 | 76.41 | 7.91 | 90.05 | -8.28 | 91.30 | 91.68 |
| B18 | 0 | 0 | 65 | 0 | 70.29 | 77.16 | 8.70 | 90.40 | -8.57 | 88.95 | 89.36 |
| B19 | 0 | 0 | 60 | 0 | 70.82 | 77.88 | 9.68 | 90.73 | -8.86 | 86.09 | 86.55 |
| B20 | 0 | 0 | 56 | 0 | 70.90 | 78.08 | 10.82 | 90.82 | -9.09 | 82.55 | 83.05 |
| B21 | 0 | 0 | 53 | 0 | 70.50 | 77.80 | 11.44 | 90.69 | -9.39 | 80.42 | 80.97 |
| B22 | 0 | 0 | 47 | 0 | 71.83 | 79.22 | 13.03 | 91.33 | -9.35 | 76.95 | 77.51 |
| C1 | 0 | 0 | 44 | 0 | 71.69 | 79.18 | 13.70 | 91.32 | -9.57 | 75.09 | 75.70 |
| C2 | 0 | 0 | 40 | 0 | 71.62 | 79.04 | 15.29 | 91.25 | -9.44 | 70.88 | 71.51 |

FIG. 10C

| Patch | C | M | Y | K | X | Y | Z | L | a | b | Chroma |
|---|---|---|---|---|---|---|---|---|---|---|---|
| H1 | 0 | 0 | 0 | 36 | 3.49 | 3.46 | 2.04 | 21.80 | 2.48 | 6.90 | 7.33 |
| H2 | 0 | 0 | 0 | 39 | 2.86 | 2.84 | 1.66 | 19.39 | 2.24 | 6.62 | 6.99 |
| H3 | 0 | 0 | 0 | 42 | 2.29 | 2.26 | 1.33 | 16.80 | 2.37 | 6.02 | 6.47 |
| H4 | 0 | 0 | 0 | 45 | 1.71 | 1.68 | 0.98 | 13.71 | 2.34 | 5.59 | 6.06 |
| H5 | 0 | 0 | 0 | 48 | 1.34 | 1.32 | 0.77 | 11.41 | 2.05 | 5.16 | 5.55 |
| H6 | 0 | 0 | 0 | 51 | 1.07 | 1.06 | 0.63 | 9.48 | 1.70 | 4.45 | 4.77 |
| H7 | 0 | 0 | 0 | 54 | 0.95 | 0.94 | 0.59 | 8.48 | 1.68 | 3.48 | 3.87 |
| H8 | 0 | 0 | 0 | 57 | 0.83 | 0.82 | 0.53 | 7.41 | 1.60 | 2.76 | 3.19 |
| H9 | 0 | 0 | 0 | 60 | 0.72 | 0.72 | 0.48 | 6.50 | 1.05 | 2.15 | 2.39 |
| H10 | 0 | 0 | 0 | 63 | 0.61 | 0.62 | 0.43 | 5.60 | 0.50 | 1.54 | 1.62 |
| H11 | 0 | 0 | 0 | 66 | 0.56 | 0.57 | 0.41 | 5.15 | 0.42 | 1.14 | 1.21 |
| H12 | 0 | 0 | 0 | 69 | 0.52 | 0.53 | 0.40 | 4.79 | 0.37 | 0.70 | 0.79 |
| H13 | 0 | 0 | 0 | 72 | 0.49 | 0.50 | 0.41 | 4.52 | 0.32 | 0.05 | 0.33 |
| H14 | 0 | 0 | 0 | 75 | 0.45 | 0.47 | 0.38 | 4.25 | -0.12 | 0.15 | 0.19 |
| H15 | 0 | 0 | 0 | 78 | 0.44 | 0.46 | 0.37 | 4.16 | -0.14 | 0.18 | 0.23 |
| H16 | 0 | 0 | 0 | 81 | 0.44 | 0.45 | 0.38 | 4.06 | 0.25 | -0.17 | 0.30 |
| H17 | 0 | 0 | 0 | 84 | 0.40 | 0.42 | 0.36 | 3.79 | -0.20 | -0.26 | 0.32 |
| H18 | 0 | 0 | 0 | 87 | 0.41 | 0.42 | 0.37 | 3.79 | 0.21 | -0.44 | 0.49 |
| H19 | 0 | 0 | 0 | 90 | 0.38 | 0.40 | 0.35 | 3.61 | -0.23 | -0.38 | 0.44 |
| H20 | 0 | 0 | 0 | 93 | 0.38 | 0.40 | 0.35 | 3.61 | -0.23 | -0.38 | 0.44 |
| H21 | 0 | 0 | 0 | 96 | 0.37 | 0.39 | 0.34 | 3.52 | -0.24 | -0.35 | 0.42 |
| H22 | 0 | 0 | 0 | 100 | 0.35 | 0.37 | 0.33 | 3.34 | -0.27 | -0.47 | 0.54 |

FIG. 10D

| Patch | C | M | Y | K | X | Y | Z | L | a | b | Chroma |
|---|---|---|---|---|---|---|---|---|---|---|---|
| C3 | 100 | 100 | 100 | 0 | 1.45 | 1.85 | 2.20 | 14.68 | -8.82 | -6.86 | 11.17 |
| C4 | 100 | 100 | 80 | 0 | 1.27 | 1.62 | 2.57 | 13.35 | -8.43 | -12.33 | 14.93 |
| C5 | 100 | 100 | 60 | 0 | 1.19 | 1.42 | 3.00 | 12.09 | -5.52 | -17.83 | 18.67 |
| C6 | 100 | 100 | 40 | 0 | 1.25 | 1.23 | 4.30 | 10.78 | 2.05 | -28.54 | 28.62 |
| C7 | 100 | 100 | 0 | 0 | 2.63 | 1.07 | 12.99 | 9.56 | 40.34 | -63.93 | 75.60 |
| C8 | 100 | 80 | 100 | 0 | 1.37 | 2.14 | 2.29 | 16.21 | -17.71 | -5.03 | 18.41 |
| C9 | 100 | 80 | 60 | 0 | 1.17 | 1.65 | 3.19 | 13.53 | -12.39 | -16.72 | 20.81 |
| C10 | 100 | 80 | 40 | 0 | 1.19 | 1.41 | 4.31 | 12.02 | -5.24 | -26.45 | 26.97 |
| C11 | 100 | 60 | 80 | 0 | 1.25 | 2.36 | 2.80 | 17.27 | -25.95 | -7.39 | 26.98 |
| C12 | 100 | 60 | 60 | 0 | 1.17 | 2.07 | 3.33 | 15.85 | -22.38 | -13.69 | 26.24 |
| C13 | 100 | 60 | 40 | 0 | 1.19 | 1.78 | 4.38 | 14.29 | -14.99 | -22.95 | 27.42 |
| C14 | 100 | 60 | 0 | 0 | 3.42 | 1.81 | 17.69 | 14.46 | 33.01 | -67.20 | 74.87 |
| C15 | 100 | 40 | 100 | 0 | 1.58 | 3.71 | 2.81 | 22.69 | -39.75 | 1.87 | 39.80 |
| C16 | 100 | 40 | 80 | 0 | 1.42 | 3.31 | 3.11 | 21.24 | -37.97 | -2.85 | 38.08 |
| C17 | 100 | 40 | 60 | 0 | 1.26 | 2.84 | 3.63 | 19.39 | -34.77 | -9.59 | 36.07 |
| C18 | 100 | 40 | 40 | 0 | 1.32 | 2.51 | 4.87 | 17.96 | -26.78 | -19.32 | 33.02 |
| C19 | 100 | 0 | 100 | 0 | 2.82 | 10.24 | 4.16 | 38.27 | -79.86 | 19.68 | 82.25 |
| C20 | 90 | 90 | 90 | 0 | 1.57 | 1.98 | 2.34 | 15.38 | -8.53 | -6.89 | 10.96 |
| C21 | 90 | 70 | 90 | 0 | 1.46 | 2.27 | 2.40 | 16.84 | -17.87 | -4.88 | 18.52 |
| C22 | 80 | 100 | 100 | 0 | 1.93 | 2.02 | 2.07 | 15.59 | -0.40 | -4.08 | 4.10 |
| D1 | 80 | 100 | 80 | 0 | 1.59 | 1.67 | 2.28 | 13.65 | -0.53 | -9.35 | 9.36 |
| D2 | 80 | 100 | 60 | 0 | 1.37 | 1.37 | 2.69 | 11.76 | 1.47 | -16.04 | 16.11 |
| D3 | 80 | 100 | 40 | 0 | 1.30 | 1.17 | 3.58 | 10.33 | 5.50 | -24.88 | 25.48 |
| D4 | 80 | 90 | 100 | 0 | 1.80 | 2.08 | 2.03 | 15.90 | -4.86 | -3.17 | 5.80 |
| D5 | 80 | 80 | 100 | 0 | 1.70 | 2.17 | 2.07 | 16.36 | -9.32 | -2.77 | 9.72 |
| D6 | 80 | 80 | 80 | 0 | 1.48 | 1.89 | 2.32 | 14.90 | -8.92 | -7.55 | 11.68 |
| D7 | 80 | 80 | 60 | 0 | 1.28 | 1.58 | 2.71 | 13.11 | -7.07 | -13.87 | 15.57 |
| D8 | 80 | 80 | 40 | 0 | 1.19 | 1.30 | 3.61 | 11.28 | -2.01 | -23.45 | 23.54 |
| D9 | 80 | 80 | 40 | 0 | 1.22 | 1.32 | 3.68 | 11.41 | -1.65 | -23.67 | 23.72 |
| D10 | 80 | 60 | 100 | 0 | 1.70 | 2.71 | 2.22 | 18.84 | -20.04 | 0.14 | 20.04 |
| D11 | 80 | 60 | 80 | 0 | 1.44 | 2.31 | 2.43 | 17.04 | -19.26 | -4.81 | 19.85 |
| D12 | 80 | 60 | 60 | 0 | 1.22 | 1.92 | 2.84 | 15.06 | -17.37 | -11.51 | 20.83 |
| D13 | 80 | 60 | 40 | 0 | 1.16 | 1.61 | 3.69 | 13.29 | -11.68 | -20.50 | 23.59 |
| D14 | 80 | 40 | 100 | 0 | 1.79 | 3.68 | 2.52 | 22.58 | -33.91 | 4.00 | 34.14 |
| D15 | 80 | 40 | 80 | 0 | 1.55 | 3.21 | 2.74 | 20.87 | -32.71 | -0.73 | 32.71 |
| D16 | 80 | 40 | 60 | 0 | 1.30 | 2.69 | 3.07 | 18.76 | -30.80 | -6.85 | 31.55 |

FIG. 10E

| Patch | C | M | Y | K | X | Y | Z | L | a | b | Chroma |
|---|---|---|---|---|---|---|---|---|---|---|---|
| D17 | 80 | 40 | 40 | 0 | 1.41 | 2.57 | 4.67 | 18.23 | -25.27 | -17.77 | 30.90 |
| D18 | 70 | 70 | 90 | 0 | 1.99 | 2.44 | 2.20 | 17.65 | -7.86 | -1.75 | 8.05 |
| D19 | 60 | 100 | 100 | 0 | 2.97 | 2.47 | 1.87 | 17.78 | 11.13 | 1.64 | 11.25 |
| D20 | 60 | 100 | 80 | 0 | 2.39 | 2.00 | 2.04 | 15.49 | 10.07 | -3.98 | 10.83 |
| D21 | 60 | 100 | 60 | 0 | 1.97 | 1.62 | 2.31 | 13.35 | 10.18 | -10.13 | 14.36 |
| D22 | 60 | 100 | 40 | 0 | 1.68 | 1.30 | 2.93 | 11.28 | 12.07 | -18.72 | 22.27 |
| E1 | 60 | 90 | 70 | 0 | 1.98 | 1.79 | 2.07 | 14.34 | 6.14 | -6.24 | 8.75 |
| E2 | 60 | 80 | 100 | 0 | 2.57 | 2.50 | 1.82 | 17.92 | 3.17 | 2.39 | 3.96 |
| E3 | 60 | 80 | 80 | 0 | 2.07 | 2.06 | 1.94 | 15.80 | 1.91 | -2.48 | 3.13 |
| E4 | 60 | 80 | 60 | 0 | 1.69 | 1.67 | 2.22 | 13.65 | 2.09 | -8.81 | 9.06 |
| E5 | 60 | 80 | 40 | 0 | 1.41 | 1.30 | 3.00 | 11.28 | 4.71 | -19.24 | 19.80 |
| E6 | 60 | 70 | 90 | 0 | 2.26 | 2.47 | 1.98 | 17.78 | -2.51 | 0.55 | 2.57 |
| E7 | 60 | 60 | 100 | 0 | 2.36 | 2.92 | 1.98 | 19.72 | -8.79 | 3.89 | 9.61 |
| E8 | 60 | 60 | 80 | 0 | 1.92 | 2.40 | 2.10 | 17.46 | -8.69 | -1.15 | 8.77 |
| E9 | 60 | 60 | 60 | 0 | 1.51 | 1.92 | 2.37 | 15.06 | -8.78 | -7.70 | 11.68 |
| E10 | 60 | 60 | 40 | 0 | 1.50 | 1.76 | 3.52 | 14.17 | -5.23 | -17.87 | 18.62 |
| E11 | 60 | 40 | 100 | 0 | 2.40 | 3.92 | 2.22 | 23.41 | -23.85 | 8.00 | 25.16 |
| E12 | 60 | 40 | 80 | 0 | 1.91 | 3.24 | 2.33 | 20.98 | -24.10 | 2.85 | 24.27 |
| E13 | 60 | 40 | 60 | 0 | 1.74 | 2.96 | 2.94 | 19.88 | -23.51 | -3.95 | 23.84 |
| E14 | 60 | 40 | 40 | 0 | 2.11 | 3.24 | 5.10 | 20.98 | -19.54 | -15.32 | 24.83 |
| E15 | 53 | 70 | 90 | 0 | 2.74 | 2.65 | 1.89 | 18.58 | 3.52 | 2.82 | 4.51 |
| E16 | 53 | 53 | 90 | 0 | 2.61 | 3.13 | 2.04 | 20.56 | -7.44 | 4.76 | 8.83 |
| E17 | 40 | 100 | 100 | 0 | 4.98 | 3.30 | 1.62 | 21.21 | 25.84 | 10.19 | 27.78 |
| E18 | 40 | 100 | 80 | 0 | 4.28 | 2.79 | 1.69 | 19.18 | 25.40 | 5.93 | 26.08 |
| E19 | 40 | 100 | 60 | 0 | 3.61 | 2.33 | 2.00 | 17.13 | 24.47 | -0.76 | 24.48 |
| E20 | 40 | 100 | 40 | 0 | 2.90 | 1.81 | 2.44 | 14.46 | 24.23 | -9.34 | 25.96 |
| E21 | 40 | 80 | 100 | 0 | 4.66 | 3.44 | 1.68 | 21.73 | 19.53 | 10.43 | 22.14 |
| E22 | 40 | 80 | 80 | 0 | 3.59 | 2.68 | 1.74 | 18.71 | 17.34 | 4.59 | 17.94 |
| F1 | 40 | 80 | 60 | 0 | 2.90 | 2.14 | 1.90 | 16.21 | 16.69 | -1.38 | 16.74 |
| F2 | 40 | 80 | 40 | 0 | 2.75 | 1.94 | 2.78 | 15.17 | 18.43 | -10.86 | 21.39 |
| F3 | 40 | 60 | 100 | 0 | 4.20 | 3.72 | 1.75 | 22.72 | 9.03 | 11.40 | 14.54 |
| F4 | 40 | 60 | 80 | 0 | 3.33 | 2.96 | 1.83 | 19.88 | 8.17 | 5.67 | 9.95 |
| F5 | 40 | 60 | 60 | 0 | 2.96 | 2.62 | 2.19 | 18.45 | 8.07 | -0.26 | 8.07 |
| F6 | 40 | 60 | 40 | 0 | 3.22 | 2.77 | 3.85 | 19.10 | 9.74 | -11.49 | 15.07 |
| F7 | 40 | 40 | 100 | 0 | 4.03 | 4.67 | 1.98 | 25.77 | -6.52 | 14.33 | 15.75 |
| F8 | 40 | 40 | 80 | 0 | 3.46 | 4.16 | 2.27 | 24.19 | -8.32 | 8.92 | 12.19 |

FIG. 10F

| Patch | C | M | Y | K | X | Y | Z | L | a | b | Chroma |
|---|---|---|---|---|---|---|---|---|---|---|---|
| F9 | 40 | 40 | 40 | 0 | 4.03 | 4.65 | 5.57 | 25.71 | -6.27 | -9.52 | 11.40 |
| F10 | 0 | 100 | 100 | 0 | 28.18 | 13.91 | 1.27 | 44.10 | 72.77 | 53.87 | 90.54 |
| F11 | 0 | 0 | 0 | 0 | 87.20 | 90.78 | 75.87 | 96.32 | -0.58 | -0.85 | 1.02 |
| F12 | 56 | 44 | 85 | 0 | 2.16 | 3.27 | 2.26 | 21.09 | -18.93 | 3.66 | 19.28 |
| F13 | 65 | 44 | 75 | 0 | 1.68 | 2.92 | 2.51 | 19.72 | -24.34 | -0.85 | 24.35 |
| F14 | 75 | 44 | 65 | 0 | 1.39 | 2.67 | 2.92 | 18.67 | -27.74 | -5.89 | 28.36 |
| F15 | 85 | 44 | 56 | 0 | 1.29 | 2.55 | 3.55 | 18.14 | -28.46 | -11.22 | 30.59 |
| F16 | 95 | 44 | 44 | 0 | 1.29 | 2.41 | 4.52 | 17.51 | -25.72 | -18.19 | 31.50 |
| F17 | 44 | 56 | 95 | 0 | 3.57 | 3.55 | 1.92 | 22.12 | 2.33 | 8.63 | 8.94 |
| F18 | 56 | 56 | 85 | 0 | 2.23 | 2.78 | 2.17 | 19.14 | -9.00 | 1.11 | 9.07 |
| F19 | 65 | 56 | 75 | 0 | 1.72 | 2.47 | 2.43 | 17.78 | -14.96 | -3.52 | 15.37 |
| F20 | 75 | 56 | 65 | 0 | 1.44 | 2.26 | 2.90 | 16.80 | -18.22 | -8.97 | 20.31 |
| F21 | 85 | 56 | 56 | 0 | 1.30 | 2.14 | 3.40 | 16.21 | -19.80 | -13.56 | 24.00 |
| F22 | 95 | 56 | 44 | 0 | 1.64 | 2.42 | 4.88 | 17.55 | -16.03 | -20.08 | 25.69 |
| G1 | 44 | 65 | 95 | 0 | 3.96 | 3.62 | 2.35 | 22.37 | 7.12 | 5.08 | 8.75 |
| G2 | 56 | 65 | 85 | 0 | 2.30 | 2.53 | 2.15 | 18.05 | -2.84 | -0.58 | 2.90 |
| G3 | 65 | 65 | 75 | 0 | 1.71 | 2.15 | 2.27 | 16.26 | -8.63 | -4.77 | 9.86 |
| G4 | 75 | 65 | 65 | 0 | 1.37 | 1.93 | 2.73 | 15.12 | -13.01 | -10.56 | 16.76 |
| G5 | 85 | 65 | 56 | 0 | 1.20 | 1.78 | 3.17 | 14.29 | -14.67 | -15.27 | 21.18 |
| G6 | 95 | 65 | 44 | 0 | 1.22 | 1.72 | 4.15 | 13.94 | -12.55 | -22.21 | 25.51 |
| G7 | 44 | 75 | 95 | 0 | 3.68 | 2.99 | 1.75 | 20.00 | 13.17 | 6.71 | 14.78 |
| G8 | 56 | 75 | 85 | 0 | 2.37 | 2.31 | 1.95 | 17.04 | 2.99 | -0.44 | 3.02 |
| G9 | 65 | 75 | 75 | 0 | 1.78 | 1.99 | 2.26 | 15.43 | -3.34 | -6.10 | 6.95 |
| G10 | 75 | 75 | 65 | 0 | 1.41 | 1.76 | 2.64 | 14.17 | -7.78 | -11.47 | 13.86 |
| G11 | 85 | 75 | 56 | 0 | 1.26 | 1.66 | 3.24 | 13.59 | -9.77 | -16.97 | 19.58 |
| G12 | 95 | 75 | 44 | 0 | 1.22 | 1.56 | 4.11 | 12.98 | -8.41 | -23.62 | 25.07 |
| G13 | 44 | 85 | 95 | 0 | 4.04 | 3.02 | 1.76 | 20.12 | 17.97 | 6.81 | 19.22 |
| G14 | 56 | 85 | 85 | 0 | 2.58 | 2.29 | 1.99 | 16.94 | 7.57 | -0.99 | 7.64 |
| G15 | 65 | 85 | 75 | 0 | 1.87 | 1.88 | 2.26 | 14.84 | 1.40 | -7.11 | 7.25 |
| G16 | 75 | 85 | 65 | 0 | 1.55 | 1.71 | 2.71 | 13.89 | -2.62 | -12.53 | 12.80 |
| G17 | 85 | 85 | 56 | 0 | 1.33 | 1.56 | 3.15 | 12.98 | -5.01 | -17.38 | 18.08 |
| G18 | 95 | 85 | 44 | 0 | 1.40 | 1.60 | 4.36 | 13.23 | -4.00 | -24.66 | 24.98 |
| G19 | 44 | 95 | 95 | 0 | 4.26 | 3.02 | 1.81 | 20.12 | 21.07 | 6.29 | 21.99 |
| G20 | 56 | 95 | 85 | 0 | 2.84 | 2.31 | 2.07 | 17.04 | 12.03 | -1.59 | 12.13 |
| G21 | 65 | 95 | 75 | 0 | 2.02 | 1.87 | 2.29 | 14.79 | 5.13 | -7.47 | 9.07 |
| G22 | 75 | 95 | 65 | 0 | 1.61 | 1.61 | 2.64 | 13.29 | 1.55 | -13.00 | 13.09 |

FIG. 10G

| C | M | Y | K | Chroma | C | M | Y | K | Chroma |
|---|---|---|---|---|---|---|---|---|---|
| 47 | 53 | 80 | 0 | 5.87 | 53 | 56 | 95 | 0 | 1.75 |
| 47 | 53 | 85 | 0 | 1.74 | 53 | 60 | 80 | 0 | 5.12 |
| 47 | 53 | 90 | 0 | 2.11 | 53 | 60 | 85 | 0 | 2.24 |
| 47 | 53 | 95 | 0 | 1.11 | 53 | 60 | 90 | 0 | 1.61 |
| 47 | 56 | 80 | 0 | 3.96 | 53 | 60 | 95 | 0 | 1.39 |
| 47 | 56 | 85 | 0 | 0.13 | 53 | 65 | 80 | 0 | 3.28 |
| 47 | 56 | 90 | 0 | 1.63 | 53 | 65 | 85 | 0 | 1.38 |
| 47 | 56 | 95 | 0 | 0.75 | 53 | 65 | 90 | 0 | 1.80 |
| 47 | 60 | 80 | 0 | 2.90 | 53 | 65 | 95 | 0 | 1.22 |
| 47 | 60 | 85 | 0 | 3.63 | 53 | 70 | 80 | 0 | 1.46 |
| 47 | 60 | 90 | 0 | 3.54 | 53 | 70 | 85 | 0 | 3.24 |
| 47 | 60 | 95 | 0 | 2.16 | 53 | 70 | 90 | 0 | 4.51 |
| 47 | 65 | 80 | 0 | 1.82 | 53 | 70 | 95 | 0 | 3.37 |
| 47 | 65 | 85 | 0 | 4.54 | 53 | 75 | 80 | 0 | 0.93 |
| 47 | 65 | 90 | 0 | 6.06 | 53 | 75 | 85 | 0 | 5.09 |
| 47 | 65 | 95 | 0 | 5.71 | 53 | 75 | 90 | 0 | 6.59 |
| 47 | 70 | 80 | 0 | 6.88 | 53 | 75 | 95 | 0 | 6.19 |
| 47 | 70 | 85 | 0 | 9.38 | 53 | 80 | 80 | 0 | 1.62 |
| 47 | 70 | 90 | 0 | 8.90 | 53 | 80 | 85 | 0 | 6.39 |
| 47 | 70 | 95 | 0 | 9.44 | 53 | 80 | 90 | 0 | 8.39 |
| 47 | 75 | 80 | 0 | 4.87 | 53 | 80 | 95 | 0 | 8.87 |
| 47 | 75 | 85 | 0 | 9.63 | 56 | 53 | 80 | 0 | 11.98 |
| 47 | 75 | 90 | 0 | 10.53 | 56 | 53 | 85 | 0 | 6.97 |
| 47 | 75 | 95 | 0 | 12.62 | 56 | 53 | 90 | 0 | 5.74 |
| 47 | 80 | 80 | 0 | 5.22 | 56 | 53 | 95 | 0 | 6.10 |
| 47 | 80 | 85 | 0 | 10.24 | 56 | 56 | 80 | 0 | 8.23 |
| 47 | 80 | 90 | 0 | 13.05 | 56 | 56 | 85 | 0 | 9.07 |
| 47 | 80 | 95 | 0 | 14.87 | 56 | 56 | 90 | 0 | 3.91 |
| 53 | 53 | 80 | 0 | 9.46 | 56 | 56 | 95 | 0 | 3.59 |
| 53 | 53 | 85 | 0 | 6.13 | 56 | 60 | 80 | 0 | 5.93 |
| 53 | 53 | 90 | 0 | 8.83 | 56 | 60 | 85 | 0 | 3.81 |
| 53 | 53 | 95 | 0 | 4.19 | 56 | 60 | 90 | 0 | 2.13 |
| 53 | 56 | 80 | 0 | 6.11 | 56 | 60 | 95 | 0 | 2.20 |
| 53 | 56 | 85 | 0 | 4.13 | 56 | 65 | 80 | 0 | 4.08 |
| 53 | 56 | 90 | 0 | 2.91 | 56 | 65 | 85 | 0 | 2.90 |

FIG. 10H

| C | M | Y | K | Chroma | C | M | Y | K | Chroma |
|---|---|---|---|---|---|---|---|---|---|
| 56 | 65 | 90 | 0 | 1.46 | 60 | 75 | 85 | 0 | 0.92 |
| 56 | 65 | 95 | 0 | 1.80 | 60 | 75 | 90 | 0 | 1.82 |
| 56 | 70 | 80 | 0 | 1.65 | 60 | 75 | 95 | 0 | 0.81 |
| 56 | 70 | 85 | 0 | 2.29 | 60 | 80 | 80 | 0 | 3.13 |
| 56 | 70 | 90 | 0 | 2.70 | 60 | 80 | 85 | 0 | 2.24 |
| 56 | 70 | 95 | 0 | 1.59 | 60 | 80 | 90 | 0 | 3.37 |
| 56 | 75 | 80 | 0 | 0.48 | 60 | 80 | 95 | 0 | 1.42 |
| 56 | 75 | 85 | 0 | 3.02 | 65 | 53 | 80 | 0 | 19.05 |
| 56 | 75 | 90 | 0 | 3.93 | 65 | 53 | 85 | 0 | 12.59 |
| 56 | 75 | 95 | 0 | 2.83 | 65 | 53 | 90 | 0 | 11.12 |
| 56 | 80 | 80 | 0 | 0.97 | 65 | 53 | 95 | 0 | 13.94 |
| 56 | 80 | 85 | 0 | 4.56 | 65 | 56 | 80 | 0 | 15.71 |
| 56 | 80 | 90 | 0 | 6.15 | 65 | 56 | 85 | 0 | 10.81 |
| 56 | 80 | 95 | 0 | 4.03 | 65 | 56 | 90 | 0 | 9.11 |
| 60 | 53 | 80 | 0 | 15.24 | 65 | 56 | 95 | 0 | 10.26 |
| 60 | 53 | 85 | 0 | 9.66 | 65 | 60 | 80 | 0 | 13.68 |
| 60 | 53 | 90 | 0 | 8.40 | 65 | 60 | 85 | 0 | 8.52 |
| 60 | 53 | 95 | 0 | 8.43 | 65 | 60 | 90 | 0 | 5.06 |
| 60 | 56 | 80 | 0 | 11.51 | 65 | 60 | 95 | 0 | 5.64 |
| 60 | 56 | 85 | 0 | 6.42 | 65 | 65 | 80 | 0 | 9.80 |
| 60 | 56 | 90 | 0 | 4.93 | 65 | 65 | 85 | 0 | 5.73 |
| 60 | 56 | 95 | 0 | 4.71 | 65 | 65 | 90 | 0 | 3.51 |
| 60 | 60 | 80 | 0 | 8.77 | 65 | 65 | 95 | 0 | 4.94 |
| 60 | 60 | 85 | 0 | 5.49 | 65 | 70 | 80 | 0 | 6.62 |
| 60 | 60 | 90 | 0 | 3.29 | 65 | 70 | 85 | 0 | 4.02 |
| 60 | 60 | 95 | 0 | 3.94 | 65 | 70 | 90 | 0 | 1.67 |
| 60 | 65 | 80 | 0 | 5.77 | 65 | 70 | 95 | 0 | 4.29 |
| 60 | 65 | 85 | 0 | 3.80 | 65 | 75 | 80 | 0 | 4.80 |
| 60 | 65 | 90 | 0 | 0.95 | 65 | 75 | 85 | 0 | 3.83 |
| 60 | 65 | 95 | 0 | 2.75 | 65 | 75 | 90 | 0 | 1.60 |
| 60 | 70 | 80 | 0 | 3.62 | 65 | 75 | 95 | 0 | 1.55 |
| 60 | 70 | 85 | 0 | 0.83 | 65 | 80 | 80 | 0 | 4.38 |
| 60 | 70 | 90 | 0 | 2.57 | 65 | 80 | 85 | 0 | 1.85 |
| 60 | 70 | 95 | 0 | 2.03 | 65 | 80 | 90 | 0 | 0.95 |
| 60 | 75 | 80 | 0 | 2.75 | 65 | 80 | 95 | 0 | 1.63 |

FIG. 10I

| Patch | C | M | Y | K | X | Y | Z | Tonal Value |
|---|---|---|---|---|---|---|---|---|
| A1 | 0 | 0 | 100 | 0 | 68.72 | 72.85 | 4.55 | 100.00 |
| A2 | 0 | 0 | 98 | 0 | 69.11 | 73.39 | 4.76 | 99.70 |
| A3 | 0 | 0 | 95 | 0 | 69.04 | 73.65 | 4.92 | 99.46 |
| A4 | 0 | 0 | 90 | 0 | 69.24 | 74.36 | 5.13 | 99.15 |
| A5 | 0 | 0 | 85 | 0 | 69.23 | 74.89 | 5.28 | 98.93 |
| A6 | 0 | 0 | 80 | 0 | 68.89 | 75.02 | 5.63 | 98.43 |
| A7 | 0 | 0 | 75 | 0 | 68.96 | 75.45 | 6.37 | 97.34 |
| A8 | 0 | 0 | 70 | 0 | 68.78 | 75.58 | 6.88 | 96.60 |
| A9 | 0 | 0 | 65 | 0 | 69.15 | 76.14 | 7.45 | 95.76 |
| A10 | 0 | 0 | 61 | 0 | 69.03 | 76.14 | 8.13 | 94.76 |
| A11 | 0 | 0 | 56 | 0 | 69.33 | 76.65 | 9.51 | 92.75 |
| A12 | 0 | 0 | 52 | 0 | 69.53 | 76.95 | 11.01 | 90.55 |
| A13 | 0 | 0 | 48 | 0 | 70.14 | 77.70 | 12.54 | 88.31 |
| A14 | 0 | 0 | 44 | 0 | 70.34 | 77.96 | 13.25 | 87.27 |
| A15 | 0 | 0 | 40 | 0 | 70.55 | 78.07 | 15.28 | 84.30 |
| B1 | 0 | 0 | 36 | 0 | 71.14 | 78.62 | 18.10 | 80.17 |
| B2 | 0 | 0 | 32 | 0 | 71.90 | 79.25 | 21.75 | 74.84 |
| B3 | 0 | 0 | 28 | 0 | 72.83 | 79.93 | 26.42 | 68.00 |
| B4 | 0 | 0 | 24 | 0 | 73.73 | 80.48 | 31.20 | 61.01 |
| B5 | 0 | 0 | 20 | 0 | 74.92 | 81.17 | 37.19 | 52.24 |
| B6 | 0 | 0 | 17 | 0 | 76.02 | 81.82 | 42.33 | 44.72 |
| B7 | 0 | 0 | 15 | 0 | 76.89 | 82.44 | 45.36 | 40.28 |
| B8 | 0 | 0 | 12 | 0 | 77.83 | 82.91 | 50.12 | 33.32 |
| B9 | 0 | 0 | 10 | 0 | 78.07 | 82.80 | 53.17 | 28.86 |
| B10 | 0 | 0 | 8 | 0 | 79.22 | 83.58 | 57.31 | 22.79 |
| B11 | 0 | 0 | 6 | 0 | 79.68 | 83.65 | 60.71 | 17.82 |
| B12 | 0 | 0 | 4 | 0 | 80.43 | 84.02 | 64.47 | 12.32 |
| B13 | 0 | 0 | 3 | 0 | 80.47 | 83.87 | 65.99 | 10.09 |
| B14 | 0 | 0 | 2 | 0 | 81.19 | 84.36 | 68.53 | 6.38 |
| B15 | 0 | 0 | 0 | 0 | 82.20 | 84.93 | 72.89 | 0.00 |

FIG. 13

METHODS AND APPARATUS FOR DETERMINING COLORANT LIMITS FOR CALIBRATING DIGITAL IMAGING DEVICES

BACKGROUND

This invention relates to color image processing. In particular, this invention relates to methods and apparatus for calibrating digital color imaging devices using colorimetric or spectrophotometric techniques. Digital color imaging devices, such as digital color printers and color copiers, have become increasingly popular in recent years. Indeed, while the cost of digital color imaging devices has dropped significantly, the number of hardware devices and software applications that are capable of producing color output that may be printed on such devices has substantially increased. Further, as the output quality and resolution of digital color imaging devices has improved, the number of uses for such devices has further increased.

For example, digital color laser printers and color inkjet printers now are increasingly used as relatively low cost proofing devices for commercial printing presses. Printing a print job on a printing press is a fairly expensive and time-consuming process. As a result, mistakes or errors in the print job are expensive to correct once a press run has commenced. To minimize such costly errors, high quality inkjet printers may be used to provide a proof of the print job before going to press. Ideally, the output of the proofing printer will visually match the output of the press. As a result, the proof output may be used for purposes of approving the print job or making any necessary modifications to the print job before printing the job on the press.

Referring now to FIG. 1, a previously known printing and proofing system is described. Printing system 20 includes commercial printing system 22 and proofing system 24. Commercial printing system 22 includes input device 26, input profile 28, color processing stage 30, press profile 32 and press 34. Input device 26 may be any device that may be used to create and/or store color image 38. For example, input device 26 may be a color scanner, digital camera, computer workstation, computer memory or other similar device.

Color image 38 includes a bitmap array of pixels, with each pixel including multiple colorant values. For example, if input device 26 is a scanner, color image 38 may include pixels expressed as a combination of red, green and blue ("RGB") colorants. Colorant values typically are represented as multi-bit digital data values. Thus, if eight bits are used for each colorant, the colorant values may range from 0-255. In this regard, 0 corresponds to no colorant, and 255 corresponds to 100% colorant. The colorant values of color image 38 are defined in the device-dependent color space of input device 26.

Input profile 28 includes transformations between the color space of input device 26 and a profile connection space, such as Commission Internationale de l'Eclairage ("CIE") XYZ, or other similar profile connection space. A profile connection space derived from the XYZ color space is commonly known as the CIE LAB color space, which expresses color values in a rectangular coordinate system, with the L, a, and b values each corresponding to one of the three dimensions in the system. The L-value characterizes the lightness aspect of the region along an axis ranging from black to white, with corresponding values ranging from 0 to 100. The a-value characterizes the color of the region along an axis ranging from green to red, with positive values corresponding to red and negative values corresponding to green. The b-value characterizes the color of the region along an axis ranging from blue to yellow, with positive values corresponding to yellow and negative values corresponding to blue. Together, the a-value and the b-value may be used to express the hue ("H") and chroma ("C") of the region:

$$H = \tan^{-1}\left(\frac{b}{a}\right)$$

$$C = \sqrt{a^2 + b^2}$$

The zero point in the plane defined by the a-values and the b-values corresponds to a neutral gray color having an L-value corresponding to the intersection of the plane with the L-axis.

Input profile 28 typically is produced in accordance with the profile specification of the International Color Consortium ("ICC"), and hence is referred to as an "ICC profile." An ICC profile generally includes a transform from the profile connection space to the device space (the "forward transform"), and a transform from the device space to the profile connection space (the "backwards transform"). An input profile, however, typically includes only a backwards transform. For example, if input device is an RGB scanner, the backwards transform of input profile 28 may be used to convert device-dependent RGB colorant values to equivalent device-independent LAB colorant values.

Color processing stage 30 optionally may be used to perform various color processing operations in device-independent color space. For example, color processing stage may include software used to perform color editing or other color processing operations. Press profile 32 includes transformations between the color space of press 34 and a profile connection space, and also is typically an ICC profile. Thus, press profile 32 typically includes forward transform 32a and backwards transform 32b. For example, if press 34 is a conventional four-color offset press that uses cyan, yellow, magenta and black ("CMYK") colorants, forward transform 32a may be used to convert device-independent LAB colorant values to equivalent device-dependent colorant values $CMYK_1$. Press 34 receives $CMYK_1$ colorant values and provides press output 36 on media designed for use by a printing press.

Proofing system 24 includes press profile 32, printer profile 40, calibration stage 42 and proofing printer 46. In particular, backwards transform 32b of press profile 32 may be used to convert device-dependent colorant values $CMYK_1$ to device-independent LAB colorant values. Printer profile 40 is typically an ICC profile, and includes a forward transform between the profile connection space and the color space of proofing printer 46. Accordingly, the forward transform of printer profile 40 is used to convert device-independent LAB colorant values to device-dependent colorant values $CMYK_2$.

Calibration stage 42 typically includes hardware and/or software that: (a) maps calibrated input values to equivalent uncalibrated input values (sometimes referred to as "linearization"); (b) limits the colorant of each channel; and (c) limits the total colorant of all channels. If proofing printer 46 uses multi-shade colorants, calibration stage 42 also may convert single colorant input values to equivalent multi-shade colorant values. The mapping and per-channel colorant limit functions typically are performed using tables that are designed to match the output response of proofing printer 46 to the output response of press 34, and also limit the colorant of each channel. The total colorant limit function is used to limit the total amount of colorant that may be output by proofing printer 46 to avoid negative image artifacts caused by using excessive colorant. Proofing printer 46 may be a digital inkjet printer, such as a CMYK inkjet printer or other similar printer. Proofing printer 46 receives calibrated CMYK colorant values and provides printed output 48 on media designed for use by an inkjet or laser printer.

The process of "calibrating" a printer typically includes determining linearization table values, per-channel colorant limits, a total colorant limit ("TCL") and, optionally, distribution functions for multi-shade colorants. Referring now to FIG. 2, a previously known printer calibration process 50 is described. Beginning at step 52, a TCL is determined. In a multi-colorant printer, the amount of colorant for each channel typically is specified as a percentage between 0 and 100%. Thus, on a four-color printer, the maximum sum of all colorants that may be specified is 400%, corresponding to 100% on all four channels. If excessive colorant is used, however, undesirable image artifacts may result that produce an unacceptable print. For example, on inkjet printers, excessive colorant may cause bleeding (an undesirable mixing of colorants along a boundary between printed areas of different colorants), cockling (warping or deformation of the receiving material that may occur from using excessive colorant), flaking and smearing. In severe cases, excessive ink may cause the print media to warp so much that it interferes with the mechanical operation of the printer and may damage the printer. Thus, at step 52, a TCL is determined to minimize the effects of excessive colorant.

Previously known techniques for determining a TCL typically rely on trial and error methods that may be unsuitable for proofing purposes. In particular, previously known techniques typically involve printing several color patches that include various combinations of total amounts of colorant. A user then visually inspects the resulting printed output, and selects the patch (and thus the TCL) that produces the "best" results. A problem with such previously known techniques, however, is that the results may vary substantially from user to user, and even from time to time by the same user. The resulting lack of repeatability impairs the goal of obtaining a highly accurate proof.

Referring again to FIG. 2, after determining a TCL, at step 54 a colorant limit is determined for each channel. In a conventional printer, such as a CMYK inkjet or laser printer, the chroma response of the C, M and Y colorants as a function of the colorant amount is quasi-linear. However, beyond a certain specified colorant amount, the chroma actually begins to decrease, and the chroma response becomes highly non-linear. For the K channel, the luminance decreases with increasing colorant amount, until the luminance reaches a minimum level, but further increases in the colorant amount produce no further decrease in luminance. Indeed, for some combinations of colorants and media, oversaturation may occur, in which printed colors do not become any darker, and may actually become lighter, with increasing colorant amounts. Because it is difficult to accurately profile a printer in the non-linear region of operation, previously known techniques for calibrating a printer typically limit the colorant of each channel so that the printer operates only in the quasi-linear region and not in the oversaturation region.

Previously known techniques for determining per-channel colorant limits, however, have typically relied on density-based measurements that may be incomplete and inaccurate for proofing purposes. In particular, previously known techniques for determining per-channel colorant limits typically involve printing a target for each colorant, where the target includes several color patches that range from 0 to 100% colorant. After printing the target, a user typically measures the optical density of each patch using a densitometer or other instrument that provides optical density values. The per-channel colorant limits are then specified as the colorant values that produce a predetermined density (e.g., the lowest maximum density) on all channels.

One problem with such isometric density techniques is that they fail to consider the impact of the colorant limitation on the gray balance of the printer. When a printer outputs approximately equal percentages of C, M and Y colorants, a neutral gray should result. The human eye is very sensitive to detecting shifts in neutrality when neutral areas are compared side-by-side. Thus, gray balance may be used to determine if the gamut of one printing device (e.g., a proofing printer) matches the gamut of another printing device (e.g., a press). Previously known density-based techniques for determining per-channel colorant limits, however, typically do not ensure proper gray balance. To solve this problem, experienced users have developed their own techniques for achieving a desired density value for each colorant and also a good gray balance. Such empirical techniques vary from user to user, however, and require specialized knowledge that all users may not possess.

In addition, previously known density-based techniques for determining per-channel colorant limits may be inaccurate for proofing printers. Conventional densitometers typically operate by illuminating a printed patch using light having a known spectral distribution, and then measuring the amount of light absorbed in a narrow frequency band of the visual spectrum. The absorption measurement may then be translated to a density measurement, with higher absorption corresponding to higher density. Densitometers typically use narrow-band optical filters that are tailored to describe the behavior of colorants used on a conventional printing press. Unfortunately, however, the filters are not optimized for describing the behavior of colorants used by conventional inkjet and laser printers used for proofing. Indeed, if a colorant used by a proofing printer has a maximum absorption at a frequency outside the band of the instrument's filters, the resulting density measurements may be incorrect. As a result, density-based techniques for determining per-channel colorant limits may produce inaccurate results.

Referring again to FIG. 2, after per-channel colorant limits have been determined, in step 56, linearization tables are calculated for each channel so that the output response of proofing printer 46 matches the output response of press 34. Previously known techniques for calculating linearization tables typically involve printing a target for each colorant that includes several color patches that range from 0 to 100% colorant coverage. After printing the target, a user typically measures the optical density of each patch using a densitometer or other instrument that provides optical density values, and then calculates table values that map the input/output density response of the printer to an input/output density response of the press. As described above, however, conventional densitometers and similar measuring instruments may not accurately measure density of colorants used by conventional inkjet and laser printers used for proofing. As a result, previously-known density-based techniques for calculating linearization tables may produce similarly inaccurate results.

Referring again to FIG. 2, after linearization tables have been calculated, at optional step 58, distribution functions may be determined for multi-hue colorants. In particular, high-quality digital inkjet printers used for proofing purposes often include four primary CMYK colorants (also referred to herein as "normal cyan," "normal magenta," "normal yellow" and "normal black"), plus light cyan and light magenta colorants (indicated by lowercase "c" and "m") to provide improved image quality in the highlight regions of an image.

Referring again to FIG. 1, if proofing printer 46 is a CcMmYK printer, printer profile 40 typically converts LAB values to CMYK values, and calibration stage 42 converts cyan values into mixtures of normal cyan (C) and light cyan (c) values, and converts the magenta values into mixtures of normal magenta (M) and light magenta (m) values.

Previously known techniques for converting a specified colorant value to equivalent multi-shade colorants often rely on trial and error techniques to determine the distribution function between the colorants. The resulting distribution function may be acceptable for a first set of colorants (e.g., used in a first printer in location A), but may be unacceptable for a second set of colorants (e.g., use in a second printer in location B). As a result, unless a new distribution function is determined for the second set of colorants, the printed output of the two printers may not match. Previously known trial and error techniques, however, typically do not permit easy modification of distribution functions. Instead, the entire process must be repeated, which may be extremely time consuming and inefficient.

In view of the foregoing, it would be desirable to provide apparatus and methods for calibrating a digital imaging device in a repeatable manner.

It also would be desirable to provide apparatus and methods for calibrating a digital imaging device in an accurate manner.

It additionally would be desirable to provide apparatus and methods for calibrating a printer without requiring specialized knowledge by a user.

SUMMARY

In view of the foregoing, it is an object of this invention to provide apparatus and methods for calibrating a digital imaging device in a repeatable manner.

It also is an object of this invention to provide apparatus and methods for calibrating a digital imaging device in an accurate manner.

It additionally is an object of this invention to provide apparatus and methods for calibrating a printer without requiring specialized knowledge by a user.

These and other objects of this invention are accomplished by providing methods and apparatus for calibrating a digital color imaging device to a printing press by determining a total colorant limit, per-channel colorant limits, and channel linearization tables using calorimetric and/or spectrophotometric techniques. In addition, for digital color imaging devices that use multi-hue colorants, methods and apparatus of this invention optionally may determine distribution functions for the multi-hue colorants as a function of input values.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which:

FIGS. 6A-6C are tables of exemplary colorant values and associated calorimetric measurements for the test chart of FIG. 6;

FIG. 9 is an exemplary test chart for use with the methods of FIG. 8;

FIGS. 10A-10G are tables of exemplary colorant values and associated colorimetric measurements for the test chart of FIG. 9;

FIGS. 10H-10I are tables of exemplary interpolated colorant values and calculated chroma values in accordance with this invention;

FIG. 13 is a tables of exemplary colorant values and associated colorimetric measurements for the test chart of FIG. 12;

DETAILED DESCRIPTION

Figure 1:
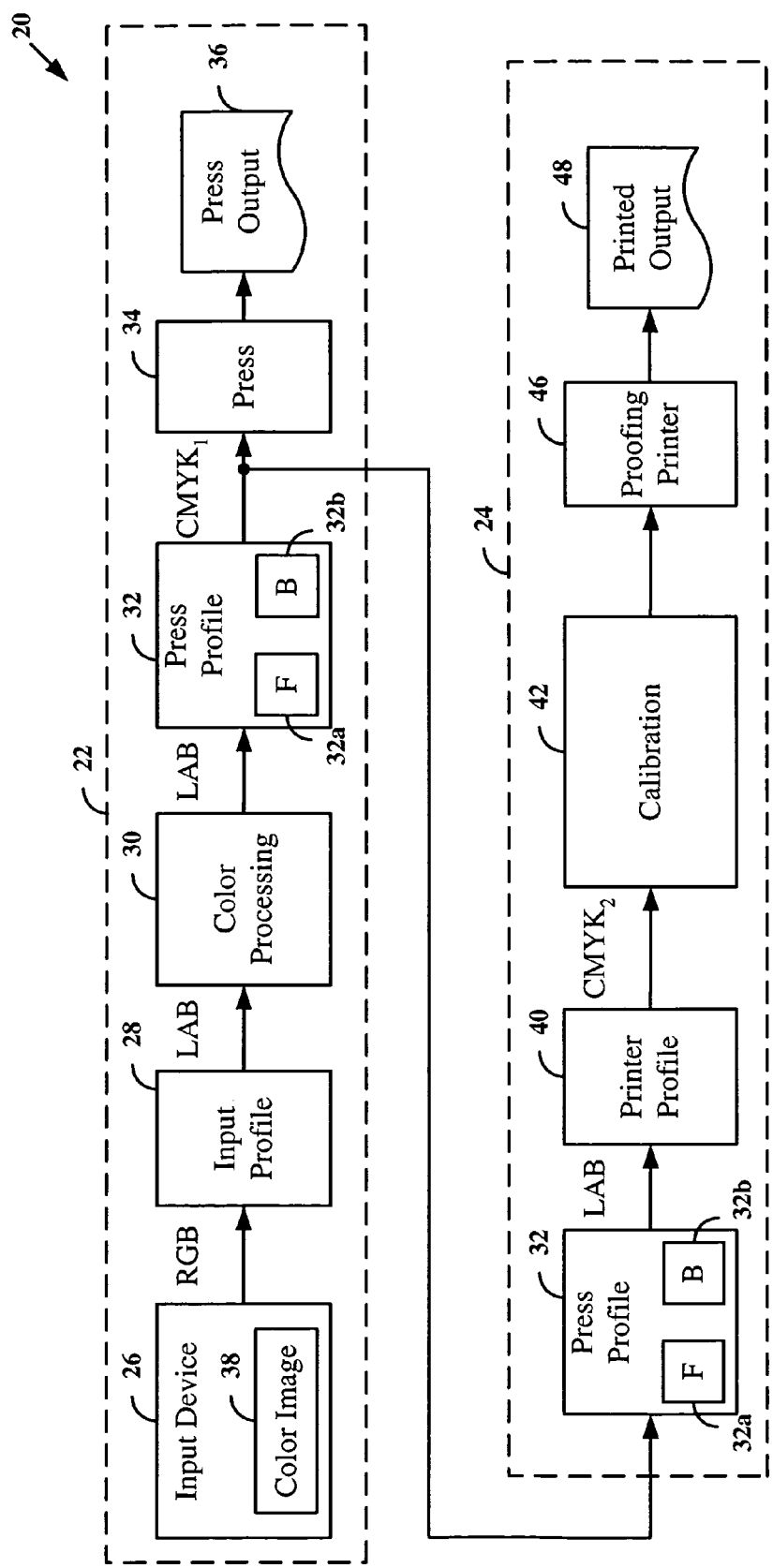
FIG. 1 is a block diagram of a previously known printing system.
Figure 2:
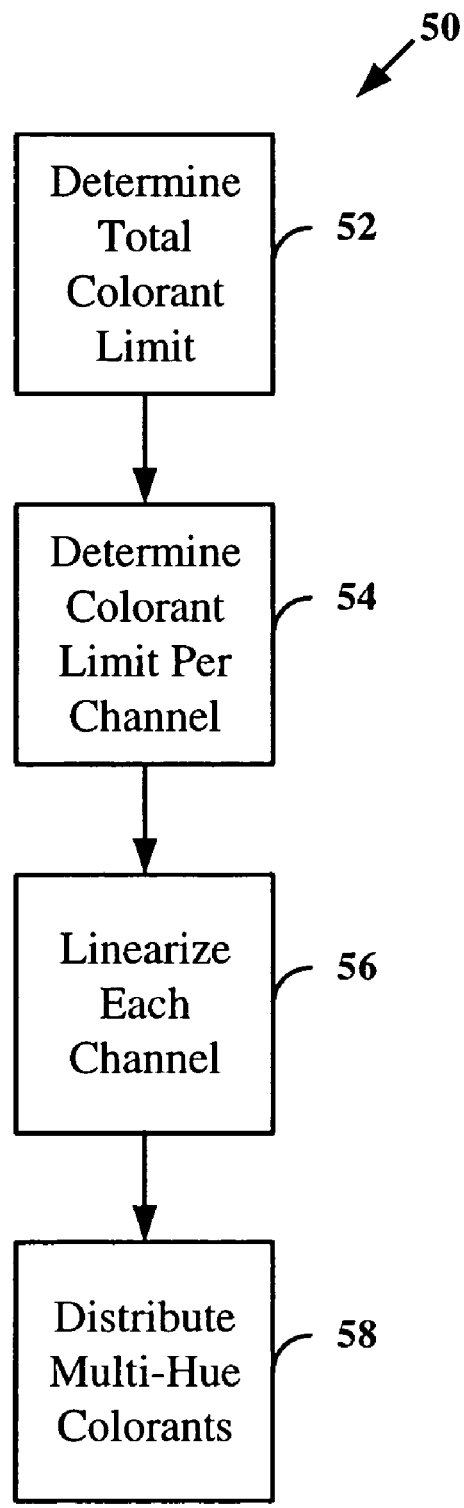
FIG. 2 is a flowchart of a previously known printer calibration process.
Figure 3:
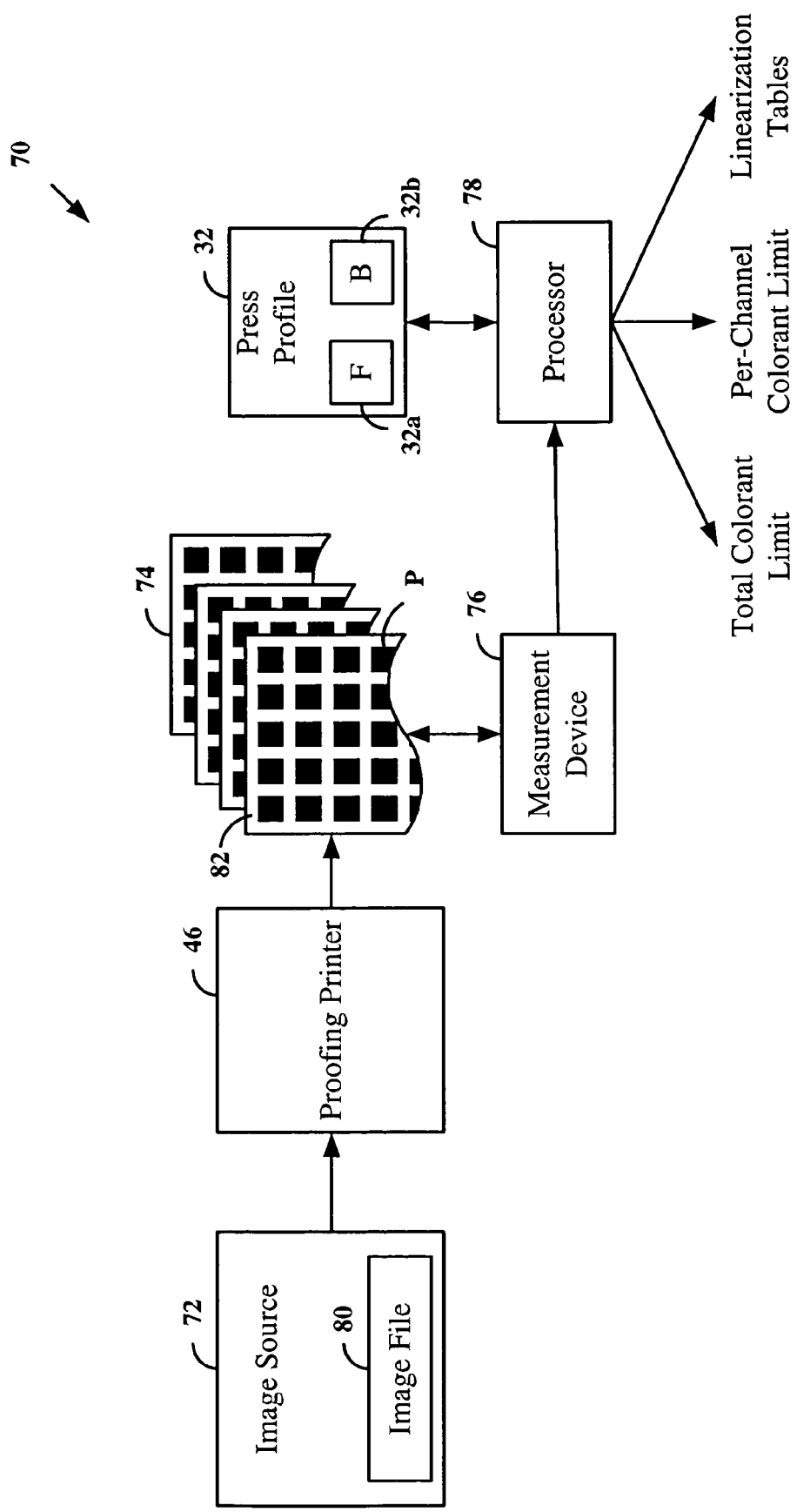
FIG. 3 is a block diagram of an exemplary calibration system in accordance with this invention.

Referring now to FIG. 3, an exemplary system in accordance with this invention is described for calibrating a digital imaging device using colorimetric and/or spectrophotometric techniques. Calibration system 70 includes image source 72, proofing printer 46, output pages 74, measurement device 76, press profile 32 and processor 78. Image source 72 includes image file 80 that comprises digital data representing test patterns 82 to be printed by proofing printer 46. Image source 72 may be a personal computer, laptop computer, handheld computer, computer workstation, print server, personal digital assistant, or any other similar device that may be used to provide image files for printing by color imaging devices.

Image source 72 may include a software application (not shown) used to generate image file 80. For example, image source 72 may be a personal computer that includes software that may be used to generate image file 80. Image file 80 may be a digital data file that describes test patterns 82 in a page description language, such as PostScript, PCL, or other similar page description language, or may simply be a raster image, such as a TIFF image, RAW image, or other similar raster image. Proofing printer 46 may be a laser printer, inkjet printer or other similar color imaging device that uses one or more colorants to provide output pages 74 including test patterns 82. For example, proofing printer 46 may be a four-color inkjet printer that uses CMYK colorants, a six-color inkjet printer that uses CcMmYK, or other similar multi-colorant imaging device. Test patterns 82 include one or more color patches P.

Measurement device 76 may be any conventional measurement device that may be used to provide spectral and/or calorimetric data that describes a printed sample, such as a colorimeter, spectrophotometer, spectrocolorimeter, or other similar device. For example, measurement device 76 may be a Spectrolino spectrophotometer manufactured by Gretag-Macbeth LLC, New Windsor, N.Y., U.S.A. Measurement device 76 provides calorimetric data, such as CIE LAB data (referred to herein as "LAB data"), CIE XYZ data (referred to herein as "XYZ data"), CIE LCH data (referred to herein as "LCH data," where L-values correspond to lightness, C-values correspond to chroma, and H-values correspond to hue), or other similar calorimetric and/or spectral data that describes printed samples, such as color patches P.

Processor 78 may be a personal computer, laptop computer, handheld computer, computer workstation, print server, personal digital assistant, or any other similar device that may be used to receive calorimetric data, such as LAB data (i.e., L-, a- and b-values), LCH data (i.e., L-, C- and H-values), or other similar calorimetric and/or spectral data from measurement device 76 and generate therefrom calibration data. Persons of ordinary skill in the art will understand that the functions of processor 78 may be implemented by image source 72. In accordance with this invention, processor 78 determines total colorant limit, per-channel colorant limits, and channel linearization tables (one table per colorant) using calorimetric and/or spectrophotometric techniques. For proofing printers that use multi-hue colorants (e.g., light and normal cyan), processor 78 may also determine distribution functions for the multi-hue colorants as a function of input values. Each of these techniques will be discussed in turn.

Total Colorant Limit

Figure 4:
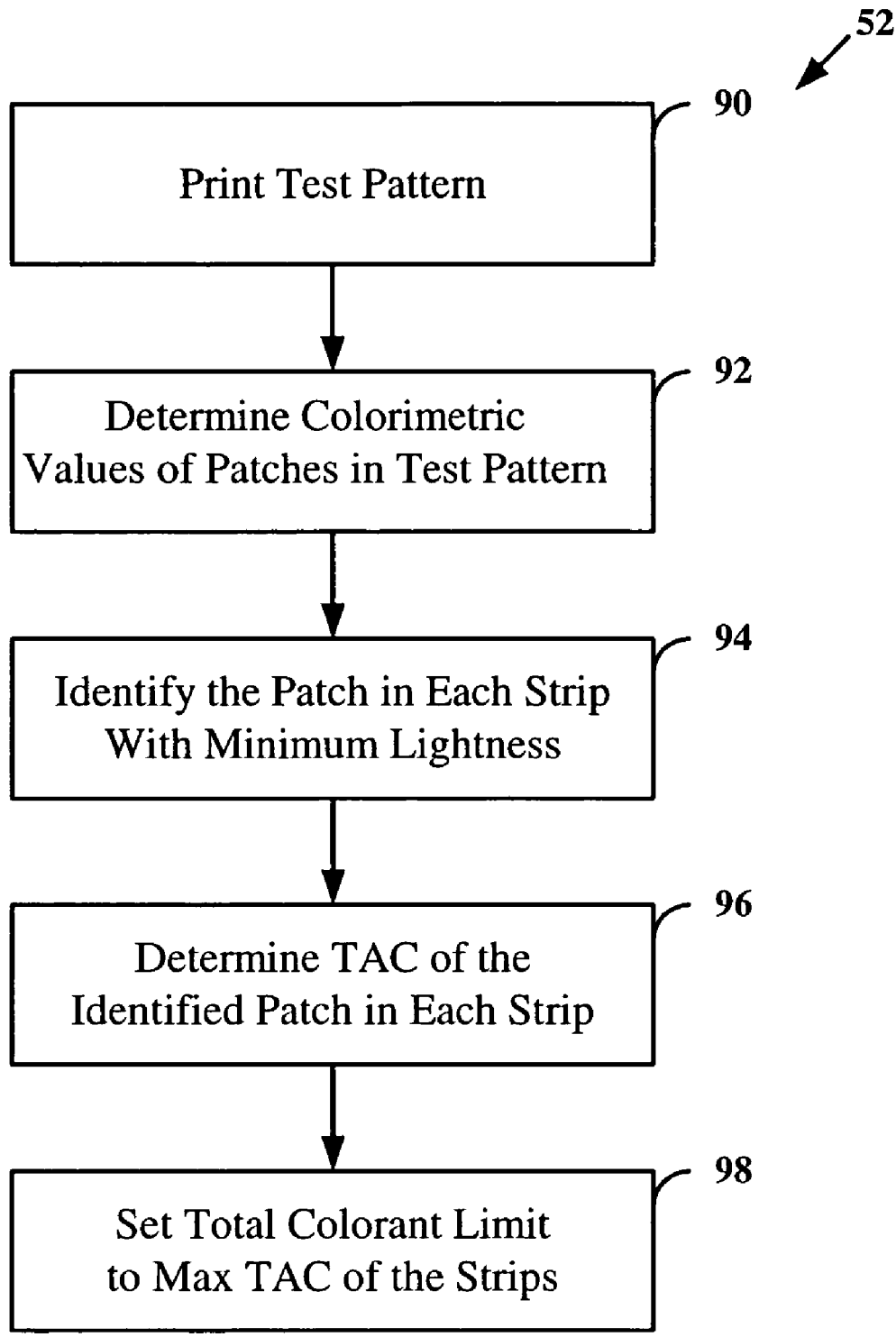
FIG. 4 is a flowchart of an exemplary process for determining a total colorant limit in accordance with this invention.
Figure 5:
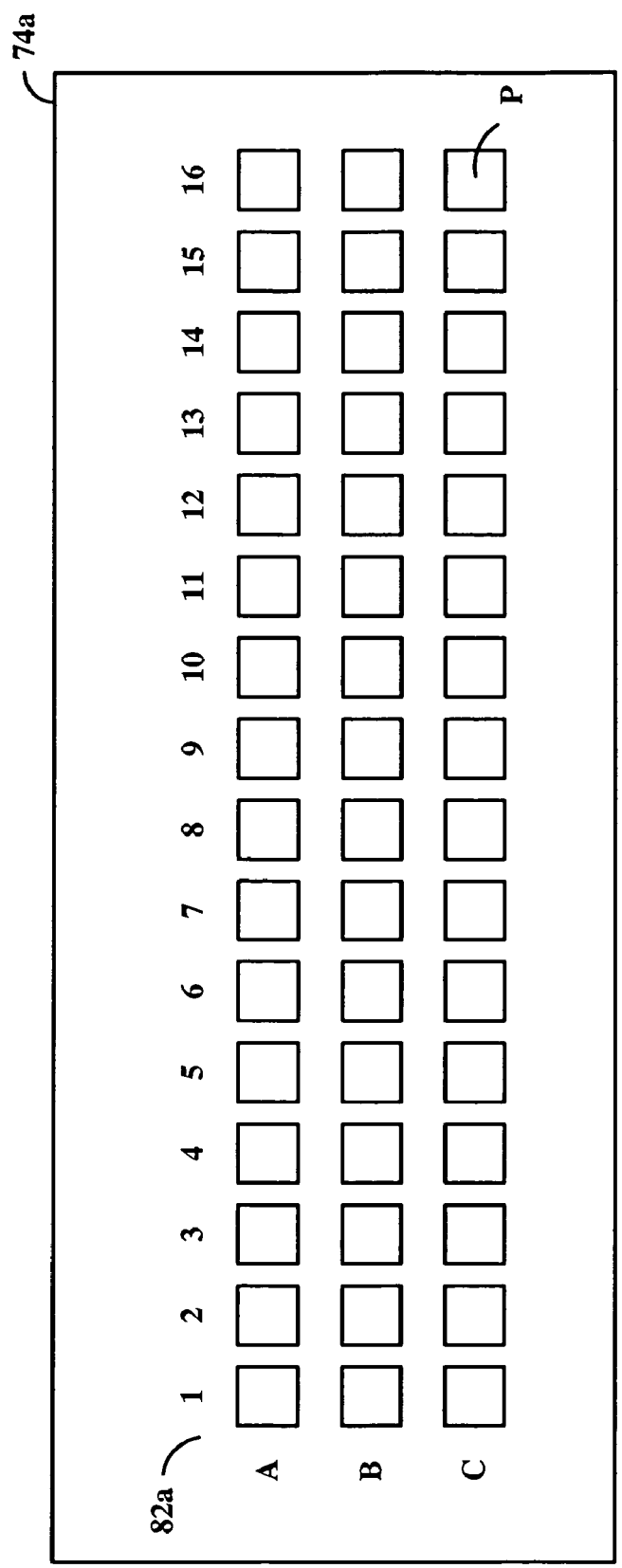
FIG. 5 is an exemplary test chart for use with the method of FIG. 4.

Referring now to FIGS. 3 and 4, exemplary methods and apparatus in accordance with this invention are described for determining a TCL of proofing printer 46. Beginning at step 90, proofing printer 46 is used to print test pattern 82 including test patches P on output page 74. For example, a user of image source 72 may issue a print command to print image file 80 including test pattern 82 on proofing printer 46. An exemplary output page 74*a* including exemplary test pattern 82*a* is illustrated in FIG. 5. Test pattern 82*a* includes an array of three strips A, B and C of test patches P, with each strip including sixteen test patches. Persons of ordinary skill in the art will understand that test pattern 82*a* may include more or less than three strips, and each strip may include more or less than sixteen test patches P. Each test patch P is comprised of a corresponding specified percentage of colorants used by proofing printer 46 (e.g., C, M, Y and K).

FIGS. 6A-6C illustrate tables of exemplary colorant values (in percent) for test patches P in strips A, B and C, respectively (patches are identified in each table by row (A, B or C) and column number (1-16)). The exemplary values provide 48 test patches P having total colorant values (i.e., the sum of the colorant percentages for each patch) that range from 99% to 300% for strip A, 100% to 200% for strip B, and 100% to 400% for strip C. In this regard, the 48 exemplary test patches P cover a broad range of total colorant values between 99% and 400%. Persons of ordinary skill in the art will understand that other colorant values also may be used for test patches P, and that the range of colorant values may include values less than 100%. In addition, persons of ordinary skill in the art will understand that the arrangement of patches within strips A, B and C, and the arrangement of the strips within test pattern 82*a* may be changed.

Referring again to FIGS. 3 and 4, at step 92, calorimetric values are determined for each test patch P printed in step 90. For example, measurement device 76 may be used to determine LAB data for each test patch P on output page 74*a*. FIGS. 6A-6C illustrate exemplary measured LAB data for test patches P in test pattern 82*a*. Referring again to FIG. 4, at step 94, a test patch P is identified in each strip A, B and C that has the minimum L-value of all of the patches in the strip. Thus, from the exemplary calorimetric values shown in FIGS. 6A-6C, the minimum L-value for strip A (10.53) corresponds to test patch A11, the minimum L-value for strip B (26.69) corresponds to test patch B9, and the minimum L-value for strip C (9.18) corresponds to test patch C9.

Referring again to FIG. 4, at step 96, the total area coverage ("TAC") is determined for each of the patches identified at step 94. The TAC of a patch equals the sum of the colorant values for the patch. Thus, referring to FIGS. 6A-6C, the TAC for exemplary test patches A11, B9, and C9 is 300%, 200% and 260%, respectively. Referring again to FIG. 4, at step 98, the TCL is set to the maximum TAC determined in step 96. Thus, for the exemplary colorant values shown in FIGS. 6A-6C, the TCL is 300%.

Per-Channel Colorant Limit

Figure 7:
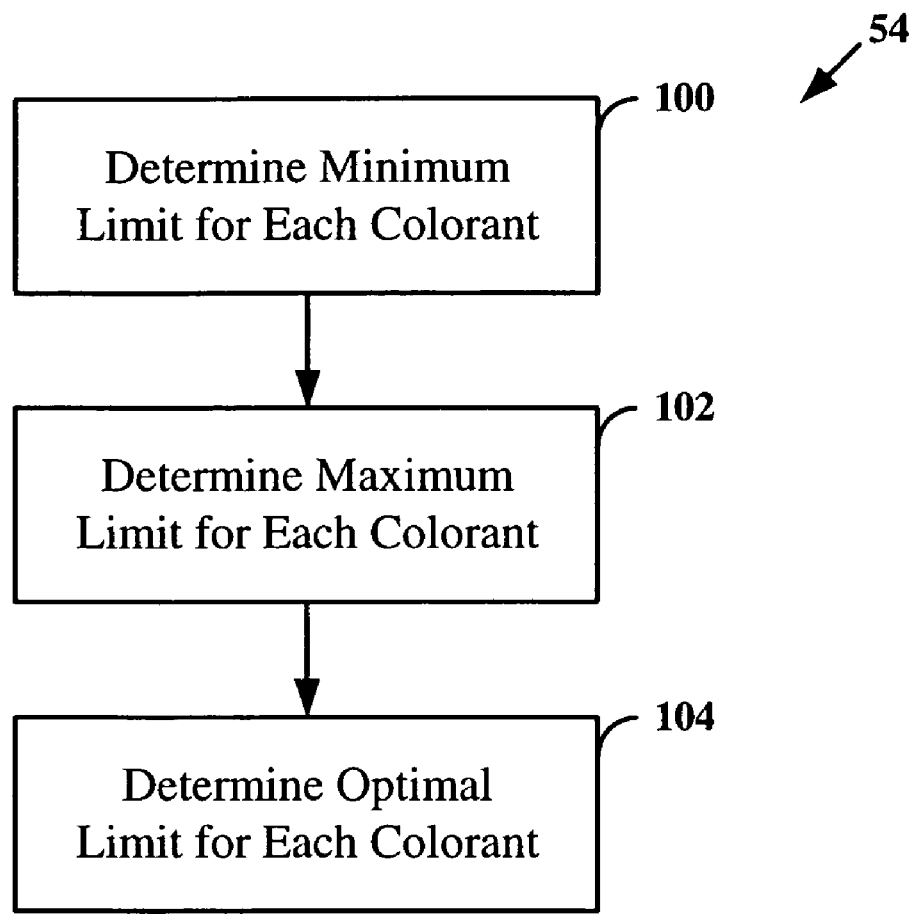
FIG. 7 is a flowchart of an exemplary process for determining per-channel colorant limits in accordance with this invention.

In addition to determining TCL, methods and apparatus in accordance with this invention also determine a limit for each colorant of proofing printer 46, while seeking to maintain the gamut of the proofing printer as large as the gamut of press 34. Referring now to FIGS. 3 and 7, exemplary methods and apparatus in accordance with this invention are described for determining per-channel colorant limits. Beginning at step 100, a minimum limit is determined for each colorant. Next, at step 102, a maximum limit is determined for each colorant. Finally, at step 104, an optimal limit between the minimum and maximum limit is determined for each colorant. Each of these steps will be described in turn.

Figure 8A:
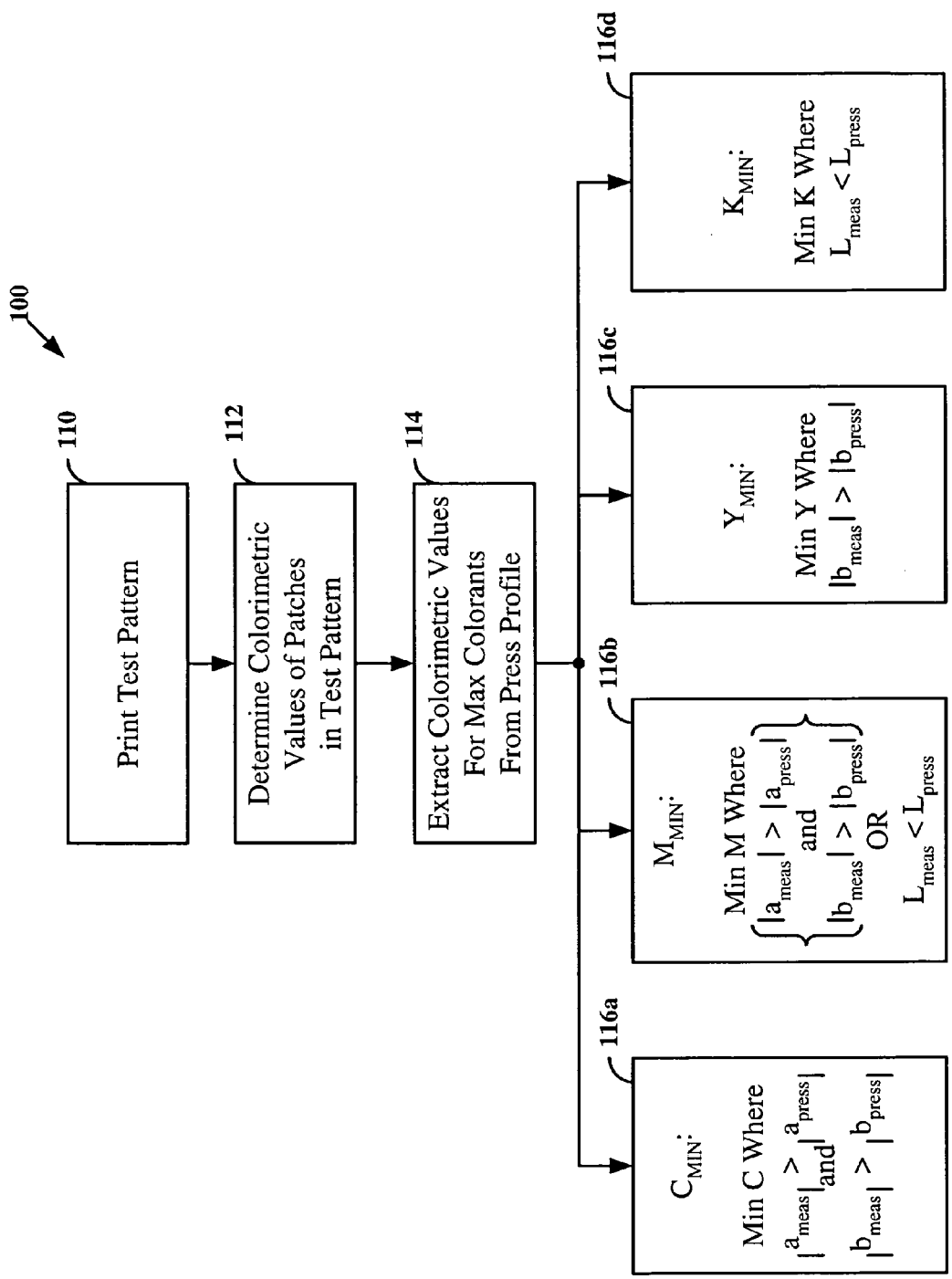
FIGS. 8A-8C are flow diagrams of exemplary methods for determining minimum, maximum and optimal per-channel colorant limits in accordance with this invention.
Figure 9:
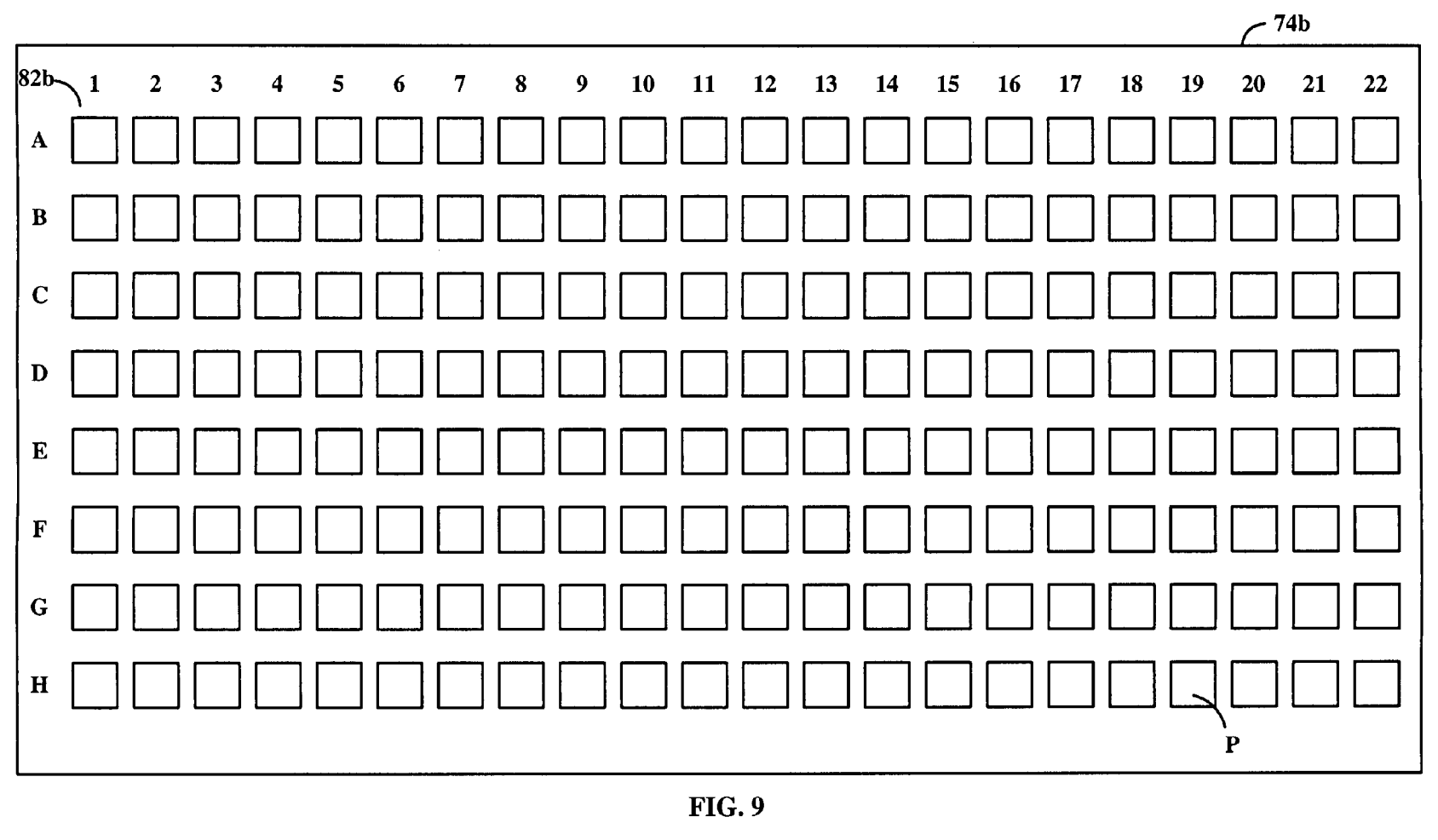

Referring now to FIGS. 3 and 8A, an exemplary method 100 for determining a minimum per-channel colorant limit is described. In particular, at step 110, proofing printer 46 is used to print test pattern 82 including test patches P on output page 74. An exemplary output page 74*b* including exemplary test pattern 82*b* is illustrated in FIG. 9. Test pattern 82*b* includes an array of eight strips A-H of test patches P, with each strip including twenty-two test patches. Persons of ordinary skill in the art will understand that test pattern 82*b* may include more or less than eight strips, and each strip may include more or less than twenty-two test patches P. Each test patch P is comprised of a corresponding specified percentage of colorants used by proofing printer 46 (e.g., C, M, Y and K).

FIGS. 100A-10G illustrate exemplary colorant values (in percent) for test patches P (patches are identified in each table by row (A-H) and column number (1-22)). The exemplary values provide test patches P having scales of single-colorant values for each colorant, and patches having various combinations of multiple-colorant values. In particular, FIG. 10A illustrates exemplary colorant values for test patches A1-A17 including a scale of cyan colorant from 100% to 28%; FIG. 10B illustrates exemplary colorant values for test patches A18-B10 including a scale of magenta colorant from 100% to 36%; FIG. 10C illustrates exemplary colorant values for test patches B11-C2 including a scale of yellow colorant from 100% to 40%; FIG. 10D illustrates exemplary colorant values for test patches H11-H22 including a scale of black colorant from 36% to 100%; and FIGS. 10E-10G illustrate exemplary colorant values for test patches C3-G22 including various combinations of C, M and Y colorants. Persons of ordinary skill in the art will understand that other specific colorant values also may be used for test patches P.

Referring again to FIG. 8A, at step 112, calorimetric values are determined for each test patch P printed in step 110. For example, measurement device 76 may be used to determine XYZ and LAB data for each test patch P on output page 74*b*. FIGS. 10A-10G illustrate exemplary measured XYZ and LAB data (and corresponding chroma data) for test patches P.

Referring again to FIG. 8A, at step 114, calorimetric values associated with maximum amounts of each colorant are extracted from press profile 32. In particular, for cyan, magenta, yellow and black, the calorimetric values that correspond to maximum amounts of cyan (i.e., CMYK value of (100, 0, 0, 0)), magenta (i.e., CMYK value of (0, 100, 0, 0)), yellow (i.e., CMYK value of (0, 0, 100, 0)) and black (i.e., CMYK value of (0, 0, 0, 100)), respectively, are extracted from backwards transform 32a of press profile 32. Table 1 illustrates exemplary calorimetric values extracted from exemplary press profile 32:

TABLE 1

| CMYK | L | a | b |
|---|---|---|---|
| (100, 0, 0, 0) | 54 | −36 | −50 |
| (0, 100, 0, 0) | 47 | 75 | −7 |
| (0, 0, 100, 0) | 88 | −6 | 95 |
| (0, 0, 0, 100) | 18 | 1 | −1 |

Referring again to FIG. 8A, at steps 116a-d, the minimum limits $C_{MIN}$, $M_{MIN}$, $Y_{MIN}$ and $K_{MIN}$ are determined for the C, M, Y and K colorants, respectively. In particular, at step 116a, the minimum cyan limit $C_{MIN}$ is identified as the colorant value of the minimum cyan patch that has a- and b-values whose magnitudes are greater than or equal to the magnitudes of the a- and b-values, respectively, extracted for cyan from press profile 32. At step 116b, the minimum magenta limit $M_{MIN}$ is identified as the colorant value of the minimum magenta patch that has: (a) a- and b-values whose magnitudes are greater than or equal to the magnitudes of the a- and b-values, respectively, extracted for magenta from press profile 32, or (b) an L-value that is less than the L-value extracted for magenta from press profile 32, whichever is lower. At step 116c, the minimum yellow limit $Y_{MIN}$ is identified as the colorant value of the minimum yellow patch that has a b-value whose magnitude is greater than or equal to the magnitude of the b-value extracted for yellow from press profile 32. At step 116d, the minimum black limit $K_{MIN}$ is identified as the colorant value of the minimum black patch that has an L-value that is less than the L-value extracted for black from press profile 32.

For example, referring to FIG. 10A, cyan test patch A12 is identified as the minimum cyan patch that has colorimetric values a =−39.72 and b=−50.34 whose magnitudes are greater than the corresponding calorimetric values extracted from press profile 32 for maximum cyan (i.e., a=−36 and b=−50 (Table 1)). The cyan value of test patch A12 is 47%. Therefore, $C_{MIN}$=47%. Referring to FIG. 10B, magenta test patch B6 is the minimum magenta patch that has colorimetric values a=75.23 and b=−21.83 whose magnitudes are greater than the magnitudes of the corresponding colorimetric values extracted from press profile 32 for maximum magenta (i.e., a=75 and b=−7 (Table 1)). In addition, magenta test patch B1 is the minimum magenta patch that has colorimetric value L=46.58 that is less than the corresponding colorimetric value extracted from press profile 32 for maximum magenta (i.e., L=47). The magenta value of test patch B1 is 75% and B6 is 53%. Therefore, the lower of these two values is $M_{MIN}$=53%. Referring to FIG. 10C, yellow test patch B15 is the minimum yellow patch that has a calorimetric value b=95.89 whose magnitude is greater than the magnitude of the corresponding calorimetric value extracted from press profile 32 for maximum yellow (i.e., b=95 (Table 1)). The yellow value of test patch B15 is 80%. Therefore, $Y_{MIN}$=80%. Referring to FIG. 10D, black test patch H3 is the minimum black patch that has a colorimetric value L=16.80 that is less than the corresponding calorimetric value extracted from press profile 32 for maximum black (i.e., L=18 (Table 1)). The black value of test patch H3 is 42%. Therefore, $K_{MIN}$=42%.

Figure 8B:
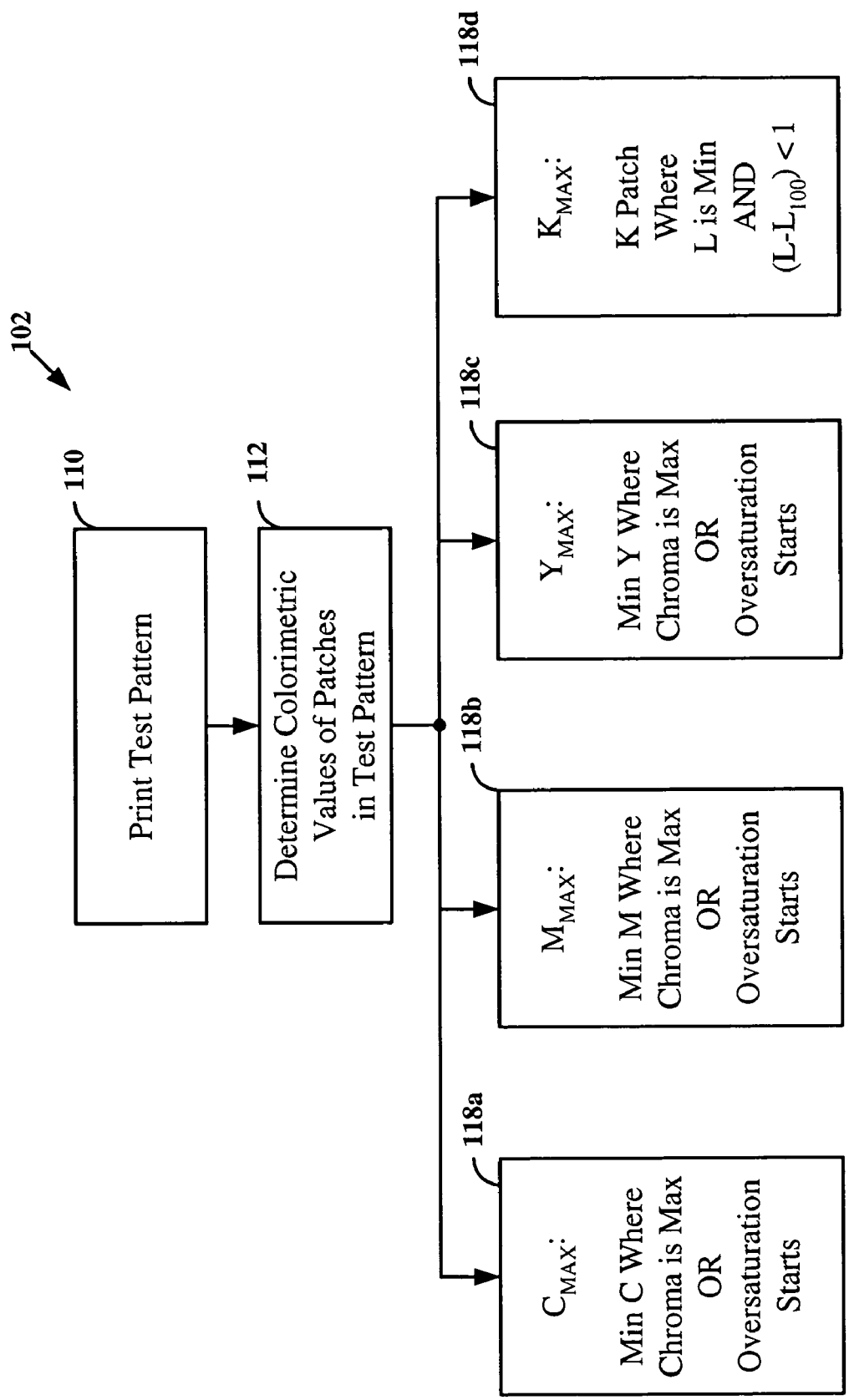

Referring now to FIG. 8B, an exemplary method 102 for determining a maximum per-channel colorant limit is described. Steps 110 and 112 have already been described above in connections with FIG. 8A. At steps 118a-d, the maximum limits $C_{MAX}$, $M_{MAX}$, $Y_{MAX}$ and $K_{MAX}$ are determined for the C, M, Y and K colorants, respectively. For the C, M and Y channels, the maximum limit $C_{MAX}$, $M_{MAX}$ and $Y_{MAX}$, is identified as the colorant value of the minimum cyan, magenta and yellow patch, respectively, where: (a) the chroma is maximum, or (b) oversaturation begins. The maximum limit $K_{MAX}$ is identified as the colorant value of the minimum black patch where: (a) the L-value is minimum, and (b) the difference between the L-value of the patch and the L-value of the 100% patch ($L_{100}$) is sufficiently small. For example, the difference is sufficiently small if the following inequality is satisfied:

$$(Int[L(i)] - Int[L_{100}]) < 1 \quad (1)$$

where Int[L(i)] is the integer portion of L(i) and Int[$L_{100}$] is the integer portion of $L_{100}$.

For C, M and Y colorants, chroma increases with increasing colorant value, but may begin to decrease beyond a certain colorant amount. As a result of rounding errors and device tolerances in measurement equipment, measured chroma values may fluctuate slightly about a maximum value. To avoid selecting a false maximum, therefore, the chroma value of each test patch is compared to the chroma values of several successive patches. For example, for a series of chroma values, the maximum chroma value may be identified as the chroma value that satisfies at least one of the following inequalities:

$$\text{chroma}(i) > \text{chroma}(i+1) > \text{chroma}(i+2) \quad (2a)$$

or $$\text{chroma}(i) > \text{chroma}(i+1) > \text{chroma}(i+3) \quad (2b)$$

In this case, the maximum chroma value must be greater than the first and second successive chroma values, or the first and third successive chroma values.

To determine if C, M or Y colorants are oversaturated, X, Y and Z calorimetric values may be used. In particular, because X-values are proportional to red reflection, and because cyan absorbs red, X-values ideally decrease with increasing amounts of cyan colorant. If cyan becomes oversaturated, however, X-values may begin to increase with increasing cyan colorant. As a result, the start of oversaturation of cyan may be identified by determining the colorant value of the patch where X-values begin to increase with increasing cyan colorant. Similarly, Y-values ideally decrease with increasing amounts of magenta colorant, and Z-values ideally decrease with increasing amounts of yellow colorant. As a result, the start of oversaturation of magenta may be identified by determining the colorant value of the patch where Y-values begin to increase with increasing magenta colorant, and the start of oversaturation of yellow may be identified by determining the colorant value of the patch where Z values begin to increase with increasing yellow colorant.

As a result of rounding errors and device tolerances in measurement equipment, X, Y and Z measurements may fluctuate slightly about a minimum value. To avoid selecting a false minimum, therefore, the X-value of each test patch is compared to the X-values of several successive patches. For example, the start of oversaturation of cyan may be identified as the colorant patch having an X-value X(i) that satisfies at least one of the following inequalities:

$$X(i)<X(i+1)<X(i+2) \quad (3a)$$

or $$X(i)<X(i+1)<X(i+3) \quad (3b)$$

In this case, the X-value must be less than the first and second successive X-values, or the first and third successive X-values. Similarly, the start of oversaturation of magenta may be identified as the colorant patch having an Y-value Y(i) that satisfies at least one of the following inequalities:

$$Y(i)<Y(i+1)<Y(i+2) \quad (4a)$$

or $$Y(i)<Y(i+1)<Y(i+3) \quad (4b)$$

and the start of oversaturation of yellow may be identified as the colorant patch having a Z-value Z(i) that satisfies at least one of the following inequalities:

$$Z(i)<Z(i+1)<Z(i+2) \quad (5a)$$

or $$Z(i)<Z(i+1)<Z(i+3) \quad (5b)$$

For K, the minimum L-value may be identified as the L value L(i) that satisfies the equation:

$$L(i) \leq L(i+1) \quad (6)$$

Referring again to FIGS. 10A-10D, the above principles may be used to determine $C_{MAX}$, $M_{MAX}$, $Y_{MAX}$ and $K_{MAX}$. In particular, referring to FIG. 10A, the chroma value of cyan test patch A8 satisfies equation (2a), and therefore the maximum chroma (68.49) corresponds to a cyan colorant value of 65%. In addition, none of the X-values satisfy equation (3), and therefore cyan is not oversaturated. As a result, $C_{MAX}$=65%. Referring to FIG. 10B, the chroma value of magenta test patch A22 satisfies equation (2a), and therefore the maximum chroma (82.55) corresponds to a magenta colorant value of 80%. In addition, none of the Y-values satisfy equation (4), and therefore magenta is not oversaturated. As a result, $M_{MAX}$=80%. Referring to FIG. 10C, the chroma value of all yellow test patches satisfy equation (2a), and therefore the maximum chroma (102.15) corresponds to a yellow colorant value of 100%. In addition, none of the Z-values satisfy equation (5), and therefore yellow is not oversaturated. As a result, $Y_{MAX}$=100%. Referring to FIG. 10D, the L-value of black test patch H12 satisfies equations (1) and (6), and therefore the maximum limit for black is $K_{MAX}$=69%. Thus, following are minimum and maximum limits from the exemplary colorant data of FIGS. 10A-10D:

| Colorant | Min Limit | Max Limit |
| --- | --- | --- |
| Cyan | 47% | 65% |
| Magenta | 53% | 80% |
| Yellow | 80% | 100% |
| Black | 42% | 69% |

Figure 8C:
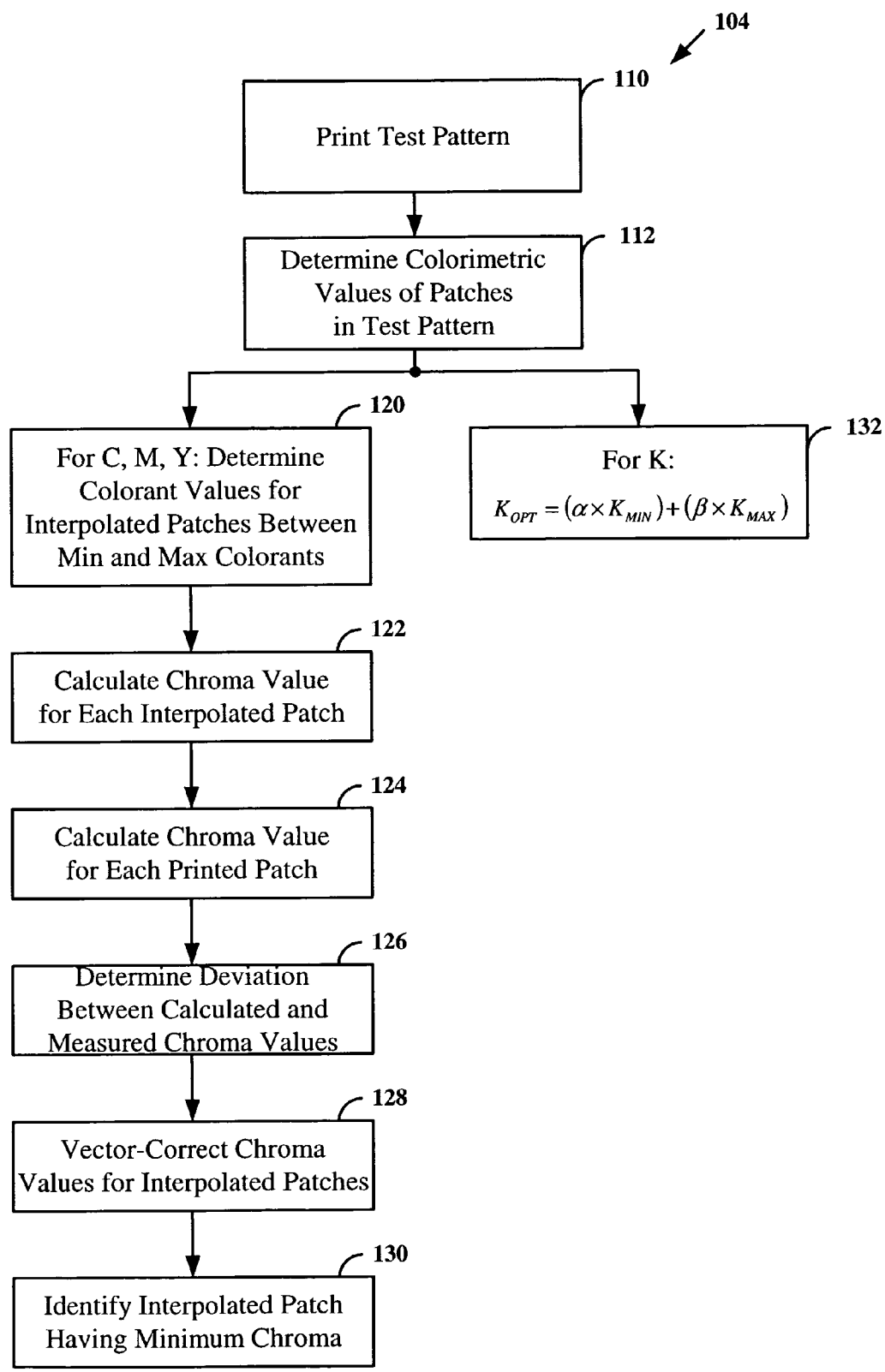

Referring now to FIG. 8C, an exemplary method 104 for determining an optimal per-channel colorant limit is described. Steps 110 and 112 have already been described above in connections with FIG. 8A. Beginning at step 120, the optimal limit $C_{OPT}$, $M_{OPT}$, and $Y_{OPT}$ is determined for the C, M and Y colorants, respectively. In particular, colorant values are determined for a plurality of "interpolated patches," consisting of combinations of the cyan, magenta and yellow colorants used to determine the minimum and maximum colorant values determined in steps 100 and 102. Thus, in the examples illustrated in FIGS. 10A-10C, interpolated patches are created using combinations of the following cyan, magenta and yellow colorants:

Cyan: 47%, 53%, 56%, 60% and 65%
Magenta: 53%, 56%, 60%, 65%, 70%, 75% and 80%
Yellow: 80%, 85%, 90%, 95% and 100%

Colorant values for such interpolated patches are illustrated in FIGS. 10H-10I.

Referring again to FIG. 8C, at step 122, the chroma value of each interpolated patch is calculated based on the specified colorant values. Any conventional technique for determining chroma values based on colorant values may be used. For example, the well-known classical Neugebauer equations may be used to calculate the chroma values for each interpolated patch. At step 124, chroma values are calculated for the multi-colorant patches printed in step 110, and illustrated in FIGS. 10E-10G, using the same technique used in step 122. Thus, for example, if the classical Neugebauer equations were used at step 122, they are also used at step 124. Next, at step 126, any deviation is determined between the chroma values calculated at step 124, and the chroma values of the multi-colorant patches measured at step 112. At step 128, the chroma values of the interpolated patches calculated at step 122 are corrected using any deviation determined at step 126. For example, well-known vector-corrected Neugebauer equations may be used to correct the calculated chroma values. FIGS. 10H-10I illustrate vector-corrected chroma values for each of the interpolated patches. Finally, at step 130, the interpolated patch having the minimum vector-corrected chroma value is identified. In the example illustrated in FIGS. 10H-10I, the minimum vector-corrected chroma value is 0.13, corresponding to an interpolated patch having CMY values (47, 56, 85). Thus, the optimal cyan, magenta and yellow colorant values that provide the best gray-balance are: $C_{OPT}$=47%, $M_{OPT}$=56% and $Y_{OPT}$=85%.

Referring again to FIG. 8C, at step 126, the optimal limit $K_{OPT}$ is determined for the K colorant, which is equal to a weighted average of the minimum and maximum limits. An exemplary optimal limit for K may be expressed as:

$$K_{OPT}=(\alpha \times K_{MIN})+(\beta \times K_{MAX}) \quad (7)$$

where $\alpha$ and $\beta$ are weighting factors. Exemplary values for the weighting factors are $\alpha$=0.7 and $\beta$=0.3. Thus, from the exemplary minimum and maximum limits $K_{MIN}$=42% and $K_{MAX}$=69%, respectively, $K_{OPT}$=50%. Persons of ordinary skill in the art will understand that other values may be used for $\alpha$ and $\beta$.

Linearization Table Calculation

Figure 11:
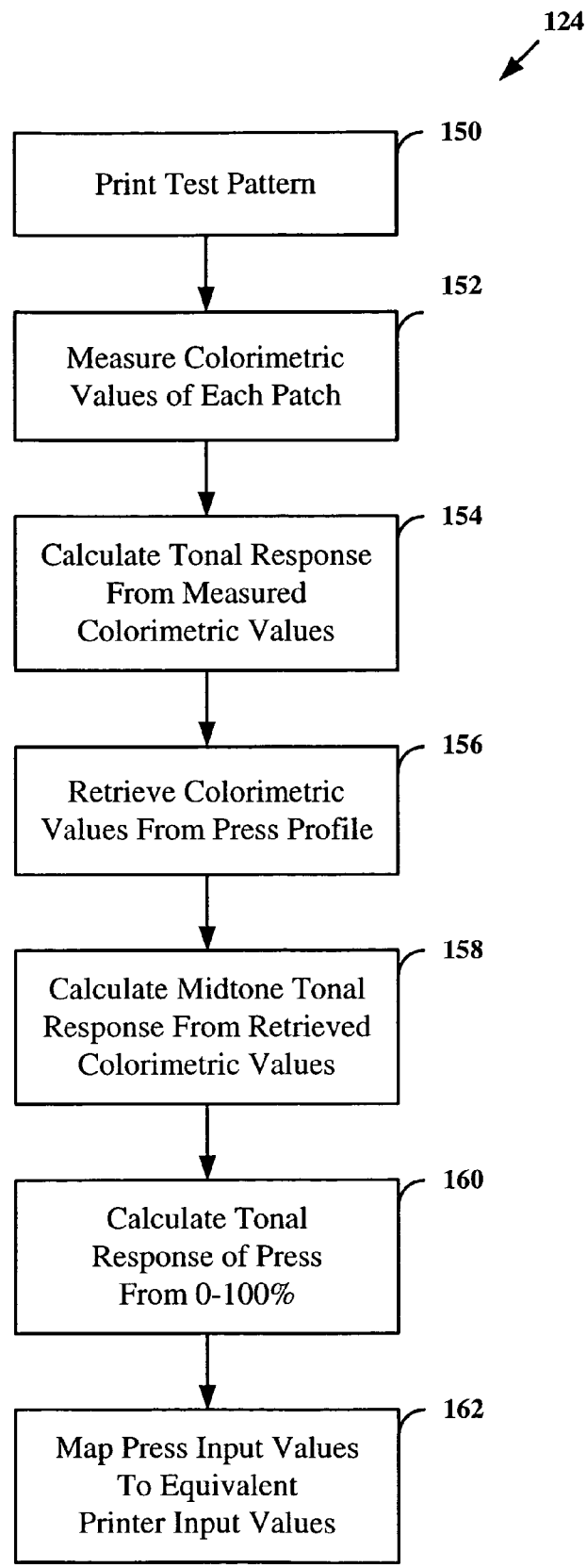
FIG. 11 is a flowchart of an exemplary process for determining a linearization table in accordance with this invention.
Figure 12:
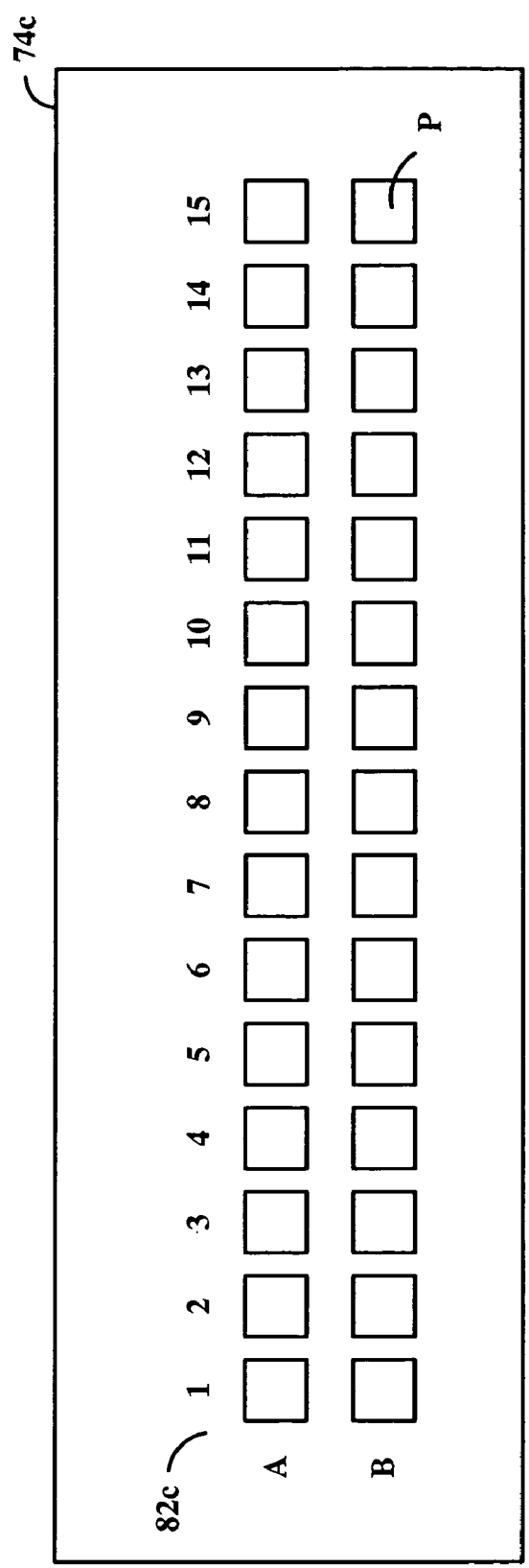
FIG. 12 is an exemplary test chart for use with the method of FIG. 11.

Referring now to FIGS. 3 and 11, exemplary methods and apparatus in accordance with this invention are described for calculating colorant linearization tables. In particular, FIG. 11 illustrates an exemplary method for calculating a colorant linearization table for a single colorant (e.g., Y). Persons of ordinary skill in the art will understand that the method may be repeated for each colorant used by proofing printer 46. Beginning at step 150, proofing printer 46 is used to print test pattern 82 including test patches P on output page 74. An exemplary output page 74c including exemplary test pattern 82c is illustrated in FIG. 12. Test pattern 82c includes two strips of test patches, with each strip including fifteen test patches P. Persons of ordinary skill in the art will understand that test pattern 82c may include more or less than two strips, and each strip may include more or less than fifteen test patches P. Each test patch P is comprised of a corresponding specified percentage of the colorant for which the linearization table is being created (Y in this example).

FIG. 13 illustrates exemplary colorant values (in percent) for yellow test patches P (patches are identified in each table by row (A-B) and column number (1-15)). The exemplary values provide test patches P having scales of single-colorant values. Persons of ordinary skill in the art will understand that other specific colorant values also may be used for test patches P. Referring again to FIG. 11, at step 152, colorimetric values are determined for each test patch P printed in step 150. For example, measurement device 76 may be used to determine XYZ data for each test patch P on output page 74c. FIG. 13 illustrates exemplary measured XYZ data for test patches P.

Referring again to FIG. 11, at step 154, tonal response values are calculated from the measured calorimetric values from step 152. As previously mentioned, X-values are inversely proportional to amounts of cyan colorant, Y-values are inversely proportional to amounts of magenta colorant, and Z-values are inversely proportional to amounts of yellow colorant. In addition, Y-values are inversely proportional to amounts of black colorant. As a result, the tonal response of a cyan colorant patch P of percent i may be expressed as:

$$\text{Tonal Value} = \frac{\left(1 - \frac{X_i}{X_W}\right)}{\left(1 - \frac{X_{100}}{X_W}\right)} \quad (8a)$$

where $X_i$ is the X-value for patch P, $X_W$ is the X-value of paper white, and $X_{100}$ is the X-value of solid cyan (i.e., C=100%).

Figure 14:
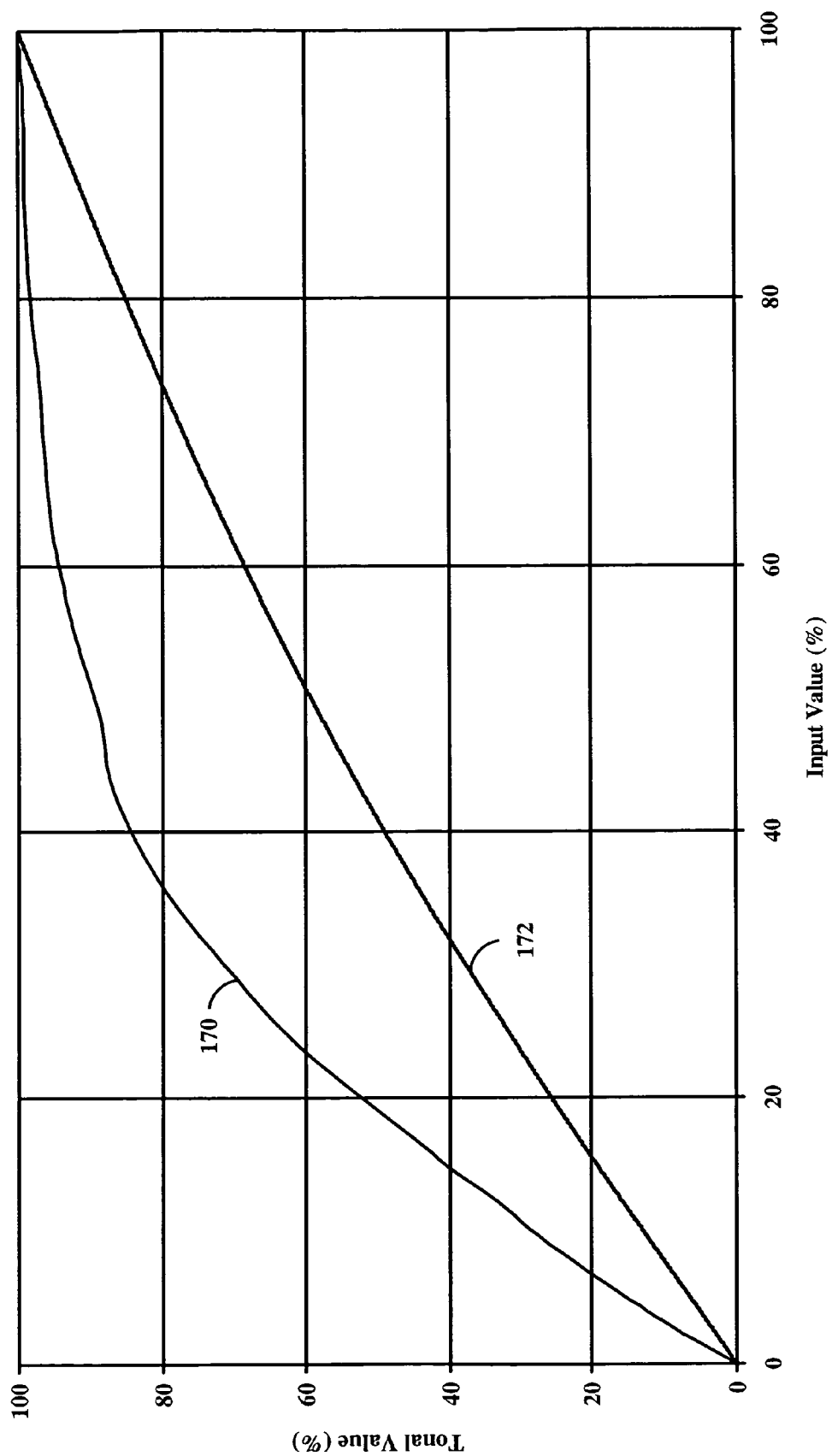
FIG. 14 is a diagram of exemplary tonal responses calculated in accordance with the method of FIG. 11.

Similarly, the tonal response of a magenta colorant patch P of percent i may be expressed as:

$$\text{Tonal Value} = \frac{\left(1 - \frac{Y_i}{Y_W}\right)}{\left(1 - \frac{Y_{100}}{Y_W}\right)} \quad (8b)$$

where $Y_i$ is the Y-value for patch P, $Y_W$ is the Y-value of paper white, and $Y_{100}$ is the Y-value of solid magenta (i.e., M=100%). Likewise, the tonal response of a yellow colorant patch P of percent i may be expressed as:

$$\text{Tonal Value} = \frac{\left(1 - \frac{Z_i}{Z_W}\right)}{\left(1 - \frac{Z_{100}}{Z_W}\right)} \quad (8c)$$

where $Z_i$ is the Z-value for patch P, $Z_W$ is the Z-value of paper white, and $Z_{100}$ is the Z-value of solid yellow (i.e., Y=100%). Similarly, the tonal response of a black colorant patch P of percent i may be expressed as:

$$\text{Tonal Value} = \frac{\left(1 - \frac{Y_i}{Y_W}\right)}{\left(1 - \frac{Y_{100}}{Y_W}\right)} \quad (8d)$$

where $Y_i$ is the Y-value for patch P, $Y_W$ is the Y-value of paper white, and $Y_{100}$ is the Y-value of solid black (i.e., K=100%). FIG. 13 illustrates exemplary tonal values calculated based on measured XYZ data for yellow test patches P. FIG. 14 illustrates a graph of the calculated tonal values versus input values, with curve 170 representing the calculated tonal values of FIG. 13.

Referring again to FIGS. 3 and 11, at step 156, XYZ data are retrieved from backwards transform 32b of press profile 32 for each colorant for 0%, 100%, and a midtone value (e.g., 40%, 50% or other similar midtone value). Table 2 illustrates exemplary XYZ values extracted from press profile 32:

TABLE 2

| C | M | Y | K | X | Y | Z |
|---|---|---|---|---|---|---|
| 100 | 0 | 0 | 0 | 15.22 | 22.09 | 55.16 |
| 0 | 100 | 0 | 0 | 32.36 | 16.37 | 15.04 |
| 0 | 0 | 100 | 0 | 68.41 | 73.38 | 5.98 |
| 0 | 0 | 0 | 100 | 2.22 | 2.36 | 1.94 |
| 40 | 0 | 0 | 0 | 52.71 | 58.79 | 70.22 |
| 0 | 40 | 0 | 0 | 60.90 | 53.95 | 51.39 |
| 0 | 0 | 40 | 0 | 76.98 | 81.94 | 43.15 |
| 0 | 0 | 0 | 40 | 39.55 | 41.03 | 37.38 |
| 0 | 0 | 0 | 0 | 85.67 | 88.32 | 78.70 |

Next, at step 158, the tonal response of press 34 is calculated using the XYZ data retrieved from press profile 32 in step 156, and equations 8(a)-8(d). Using the exemplary values in Table 2, the tonal response for yellow is:

TABLE 3

| Input Value (%) | Tonal Value (%) |
|---|---|
| 0 | 0 |
| 40 | 49 |
| 100 | 100 |

At step 160, the tonal response of press 34 is calculated for the entire range of input values from 0-100% based on the tonal values calculated in step 158. For example, a spline function may be used to calculate tonal response values for the entire range of input values using the three data points in Table 3. Curve 172 in FIG. 14 represents the tonal response values calculated in step 160. Referring again to FIG. 11, at step 162, linearization tables are created by mapping press input values to equivalent printer input values using the tonal response data. For example, using tonal response curves 170 and 172, input values of press 34 are mapped to corresponding input values for proofing printer 46 that have equivalent tonal responses. The process of FIG. 11 may be repeated for each colorant used by proofing printer 46.

Distribution of Multi-Hue Colorants

Figure 15:
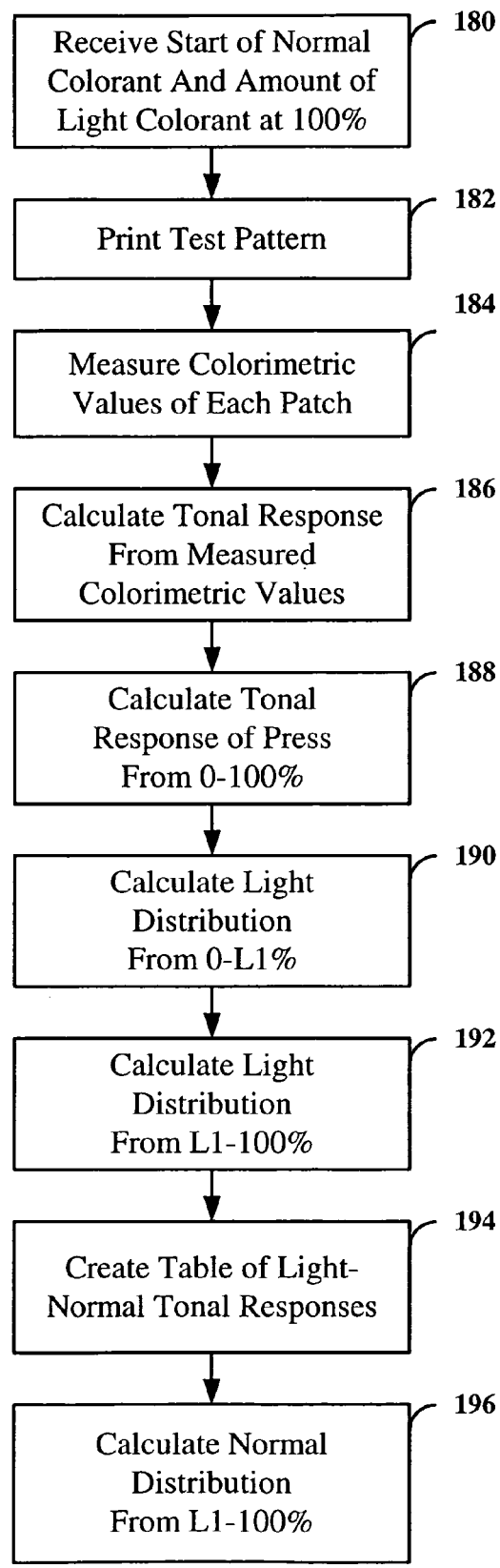
FIG. 15 is a flow diagram of an exemplary process for determining dual-tone distributions in accordance with this invention.

If proofing printer 46 uses light and normal hues of a colorant (e.g., cyan), the printer may use only light cyan over a first range of input values (e.g., 0-100%), and may use a combination of light and normal cyan over a second range of input values (e.g., 40-100%). Referring now to FIGS. 3 and 15, exemplary methods and apparatus in accordance with this invention are described for determining distribution functions of multi-hue colorants for such systems. Beginning at step 180, processor 78 determines the lower limit L1 of the second range of input values (e.g., 40%), and the amount A1 of light colorant at 100% (e.g., 5% light colorant). For example, processor 78 may prompt a user to provide these two values.

Next, at step 182, proofing printer 46 is used to print test pattern 82 including test patches P having scales of light colorant only, scales of normal colorant only, and combinations of light and normal colorant. Each test patch P is comprised of a corresponding specified percentage of light and normal colorants. Next, at step 184, calorimetric values are determined for each test patch P printed in step 182. For example, measurement device 76 may be used to determine XYZ data for each test patch P. A step 186, tonal response values are calculated from the measured calorimetric values from step 184. As previously mentioned, for cyan, tonal values are calculated using equation 8(a), for magenta, tonal values are calculated using equation 8(b), for yellow, tonal values are calculated using equation 8(c), and for black, tonal values are calculated using equation 8(d).

Next, at step 188, the tonal response of press 34 is calculated as in steps 156-160 of FIG. 11, thereby providing target tone values for the multi-hue colorant from 0-100%. At step 190, the light distribution function is calculated from 0% to L1 as in step 162 of FIG. 11. Referring again to FIG. 15, at step 192, the light colorant distribution between L1 and 100% is determined using any suitable curve fitting techniques based on the slope of the light colorant distribution curve at L1, the slope of the light colorant distribution curve at 100% (0).

Next, at step 194, a two-dimensional table is created that provides the calculated tone value for each combination of light and normal colorant calculated at step 186. Finally, at step 196, the normal colorant distribution from L1 to 100% is calculated by determining from the two dimensional table the amount of normal that when added to the light value gives the target tone value. Persons of ordinary skill in the art will understand that the light and normal colorant distribution curves may be smoothed using any conventional smoothing algorithm.

The foregoing merely illustrates the principles of this invention, and various modifications can be made by persons of ordinary skill in the art without departing from the scope and spirit of this invention.

The invention claimed is:

1. A system for calibrating a digital color imaging device to a printing press comprising a color profile having a plurality of colorants, colorant values, and associated colorimetric values, the system comprising:
   an image source comprising a test pattern adapted for printing a plurality of colors by the digital color imaging device, the test pattern comprising a plurality of patches with scales of greater than 0% and at least one of 100% of a single-colorant value for each colorant and at least one patch with a combination of multiple-colorant values other than black;
   an instrument adapted to colorimetrically measure the patches in the printed test pattern; and
   a processor adapted to generate a per-channel colorant limit by:
   (a) receiving the colorimetric measurements for each patch from the instrument;
   (b) determining a minimum colorant limit for each colorant for the digital color imaging device based on a comparison between the measured colorimetric values of the single-colorant printed patches and the colorimetric values of the press profile;
   (c) determining a maximum colorant limit for each colorant for the digital color imaging device by:
      identifying a colorant value of a minimum black patch with a minimum L-value, wherein a difference between an L-value of the minimum black patch and the L-value of a 100% black colorant patch small; and
      identifying a colorant value of a printed patch having one of the following; a maximum chroma and a colorant where oversaturation begins if the colorant is for a colorant other than black; and
   (d) determining an optimal colorant limit for each colorant by:
      determining a weighted average of the minimum and maximum colorant limits for the black colorant patches; and
      determining a colorant value that provides a gray-balance in the at least one patch with a combination of multiple-colorant values that comprise colorants other than black.

2. The system of claim 1, wherein the test pattern comprises patches having cyan, magenta, yellow and black colorants.

3. The system of claim 1, wherein the digital color imaging device is adapted to use multi-hue colorants.

4. The system of claim 1, wherein the instrument comprises a colorimeter.

5. The system of claim 1, wherein the instrument comprises a spectrophotometer.

6. The system of claim 1, wherein the instrument comprises a spectrocolorimeter.

7. The system of claim 1, wherein the colorimetric measurements comprise CIELAB data values.

8. The system of claim 1, wherein the colorimetric measurements comprise CIEXYZ data values.

9. A method for calibrating a digital color imaging device to a printing press comprising a color profile having a plurality of colorants, colorant values, and associated colorimetric values, the method comprising:
   printing a test pattern comprising a plurality of colors on the digital color imaging device, the test pattern comprising a plurality of patches, with scales of great than 0% and at least one of 100% of a single-colorant value for each colorant and at least one patch with a combination of multiple-colorant values other than black;
   colorimetrically measuring the patches in the printed test pattern; and
   generating a per-channel colorant limit by:
   determining a minimum colorant limit for each colorant for the digital color imaging device based on a comparison between the measured colorimetric values of the single-colorant printed patches and the colorimetric values of the press profile;
   determining a maximum colorant limit for each colorant for the digital color imaging device by:
      identifying in a colorant value of a minimum black patch with a minimum L-value, wherein a difference between an L-value of the minimum black patch and a L-value of the 100% black colorant patch is small; and
      identifying a colorant value of a printed patch having on of the following: a maximum chroma and a colorant where oversaturation begins if the colorant is for a colorant other than black; and determining an optimal colorant limit for each colorant by:

determining a weighted average of the minimum and maximum colorant limits for the black colorant patches; and determining a colorant value that provides a gray-balance in the at least one patch with a combination of multiple-colorant values that comprise colorants other than black.

10. The method of claim 9, wherein the test pattern comprises patches having cyan, magenta, yellow and black colorants.

11. The method of claim 9, wherein the digital color imaging device is adapted to use multi-hue colorants.

12. The method of claim 9, wherein a colorimetrically measuring comprises measuring the printed test pattern using a colorimeter.

13. The method of claim 9, wherein colorimetrically measuring comprises measuring the printed test pattern using a spectrophotometer.

14. The method of claim 9, wherein colorimetrically measuring comprises measuring the printed test pattern using a spectrocolorimeter.

15. The method of claim 9, wherein the colorimetric measurements comprise CIELAB data values.

16. The method of claim 9, wherein the colorimetric measurements comprise CIEXYZ data values.

17. The system of claim 1, further comprising a processor adapted to generate a total colorant limit by receiving the colorimetric values of the printed patches, identifying a patch with a minimum lightness, determining a total area coverage for each patch with the minimum lightness, and setting the total colorant limit to the maximum total area coverage.

18. The system of claim 3, further comprising a processor adapted to generate a distribution function of multi-hue colorants.

\* \* \* \* \*

UNITED STATES PATENT AND TRADEMARK OFFICE
CERTIFICATE OF CORRECTION

PATENT NO.        : 7,630,106 B2                                            Page 1 of 1
APPLICATION NO.   : 10/836072
DATED             : December 8, 2009
INVENTOR(S)       : Mario Kuhn and Samer Mady It is certified that error appears in the above-identified patent and that said Letters Patent is hereby corrected as shown below:

Column 5, line 47  -- "calorimetric" should be changed to "colorimetric"
Column 6, line 4   -- "calorimetric" should be changed to "colorimetric"
Column 6, line 65  -- "calorimetric" should be changed to "colorimetric"
Column 7, line 3   -- "calorimetric" should be changed to "colorimetric"
Column 7, line 8   -- "calorimetric" should be changed to "colorimetric"
Column 7, line 13  -- "calorimetric" should be changed to "colorimetric"
Column 7, line 15  -- "calorimetric" should be changed to "colorimetric"
Column 7, line 22  -- "calorimetric" should be changed to "colorimetric"
Column 7, line 61  -- "calorimetric" should be changed to "colorimetric"
Column 8, line 2   -- "calorimetric" should be changed to "colorimetric"
Column 8, line 43  -- "FIGS. 100A" should be changed to "FIGS. 10A"
Column 8, line 56  -- "H11" should be changed to "H1"
Column 8, line 62  -- "calorimetric" should be changed to "colorimetric"
Column 9, line 1   -- "calorimetric" should be changed to "colorimetric"
Column 9, line 4   -- "calorimetric" should be changed to "colorimetric"
Column 9, line 10  -- "calorimetric" should be changed to "colorimetric"
Column 9, line 46  -- "calorimetric" should be changed to "colorimetric"
Column 9, line 61  -- "calorimetric" should be changed to "colorimetric"
Column 10, line 1  -- "calorimetric" should be changed to "colorimetric"
Column 10, line 46 -- "calorimetric" should be changed to "colorimetric"
Column 13, line 23 -- "calorimetric" should be changed to "colorimetric"
Column 15, line 12 -- "calorimetric" should be changed to "colorimetric"
Column 15, line 16 -- "calorimetric" should be changed to "colorimetric"
Column 16, line 59 -- remove the word "in" after "identifying" and before "a"

Signed and Sealed this

First Day of June, 2010

David J. Kappos
*Director of the United States Patent and Trademark Office*